US005608308A

United States Patent [19]
Kiuchi et al.

[11] Patent Number: 5,608,308
[45] Date of Patent: Mar. 4, 1997

[54] ELECTRIC GENERATION CONTROL SYSTEM FOR HYBRID VEHICLE

[75] Inventors: Takeo Kiuchi; Shigeru Ibaraki, both of Wako, Japan

[73] Assignee: Honda Giken Kogyo Kabushiki Kaisha, Tokyo, Japan

[21] Appl. No.: 513,097

[22] Filed: Aug. 9, 1995

[30] Foreign Application Priority Data

Aug. 22, 1994 [JP] Japan .................................. 6-197071

[51] Int. Cl.⁶ .............................. H02P 9/00; F02N 11/00
[52] U.S. Cl. ............................. 322/11; 322/12; 322/13; 318/139; 318/153; 290/50; 180/65.2
[58] Field of Search .................................. 322/10, 11, 12, 322/13; 180/65.2; 318/139, 153; 290/50

[56] References Cited

U.S. PATENT DOCUMENTS

| | | | |
|---|---|---|---|
| 3,792,327 | 2/1974 | Waldorf | 318/139 |
| 5,251,588 | 10/1993 | Tsujii et al. | 123/142.5 R |
| 5,264,764 | 11/1993 | Kuang | 318/139 |
| 5,345,761 | 9/1994 | King et al. | 60/274 |
| 5,428,274 | 6/1995 | Furutani et al. | 318/139 |
| 5,450,324 | 9/1995 | Cikanek | 364/426.02 |
| 5,473,228 | 12/1995 | Nii | 318/158 |

FOREIGN PATENT DOCUMENTS

| | | |
|---|---|---|
| 570234A1 | 5/1992 | European Pat. Off. . |
| 570242A1 | 5/1992 | European Pat. Off. . |
| 4133013 | 10/1991 | Germany . |
| 3169203 | 11/1991 | Japan . |

OTHER PUBLICATIONS

English language Abstract of JP 3-169203.

*Primary Examiner*—Steven L. Stephan
*Assistant Examiner*—Nicholas Ponomarenko
*Attorney, Agent, or Firm*—Lyon & Lyon

[57] ABSTRACT

The opening of the intake air control valve of an engine which actuates a generator on a hybrid vehicle is basically controlled by an intake air control valve control assembly to cause the engine to produce a power output corresponding to a target generated output which is determined by a target generated output setting assembly based on an operating condition of the hybrid vehicle. When regenerative braking of a propulsive electric motor is detected by a regenerative braking detector, the opening of the intake air control valve is corrected in a direction to decrease. Even when the load on the engine drops sharply or is greatly reduced by regenerative braking of the propulsive electric motor, the engine is prevented from racing, and from discharging unwanted exhaust emissions and also from suffering undue vibrations.

12 Claims, 20 Drawing Sheets

CRANKING CONTROL MODE

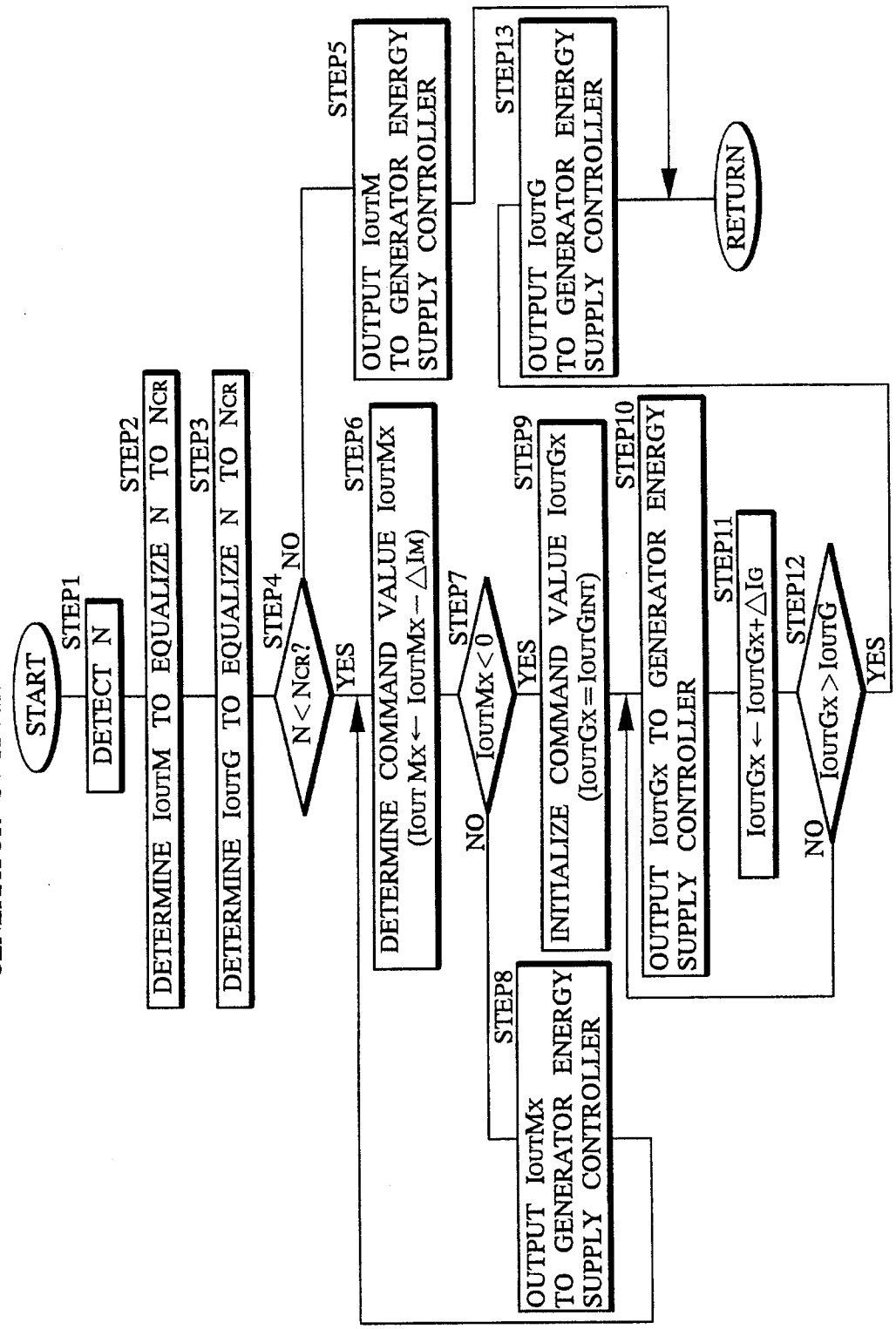

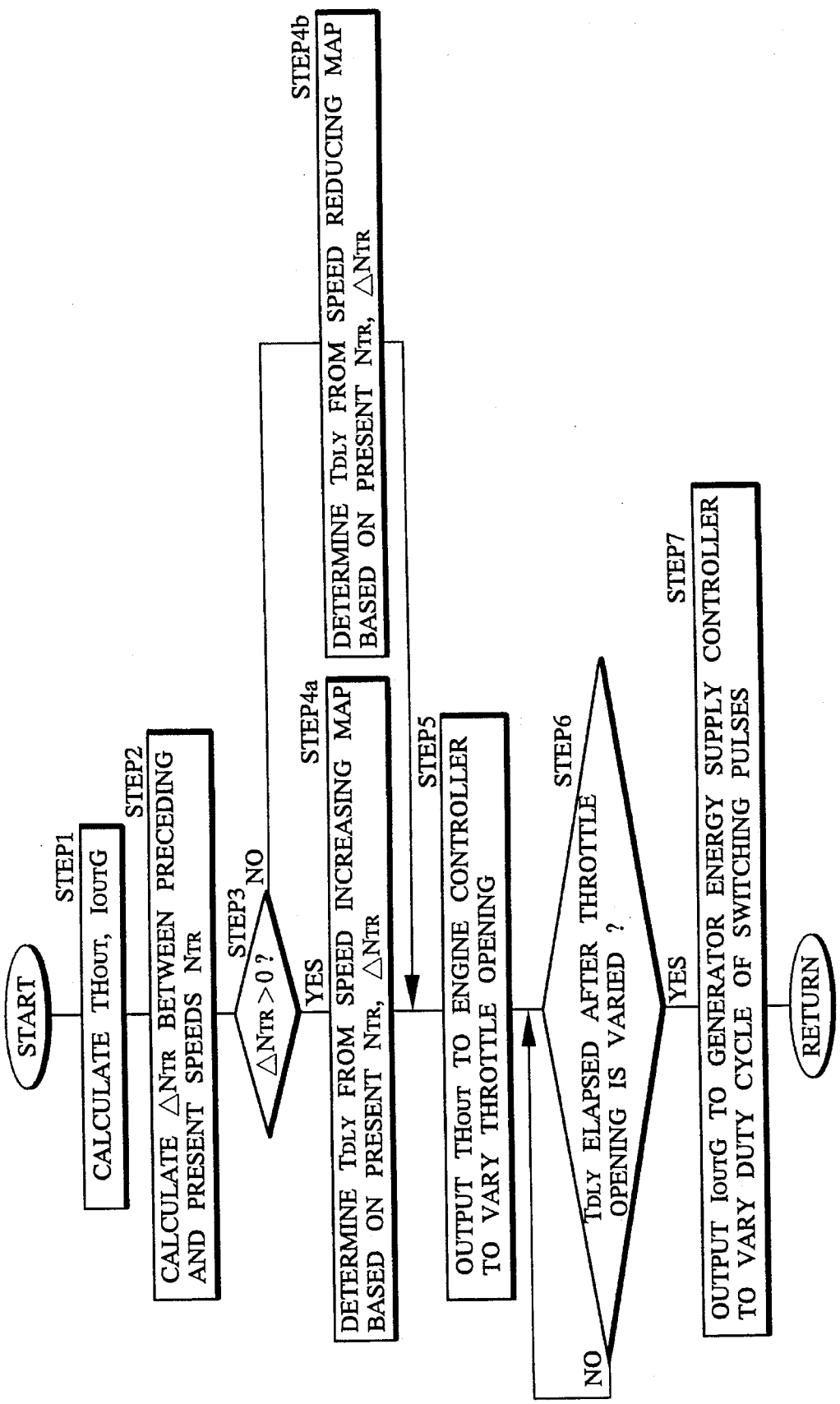

ELECTRIC GENERATION CONTROL SYSTEM FOR HYBRID VEHICLE

BACKGROUND OF THE INVENTION

1. Field of the Invention

The present invention relates to an electric generation control system for use on a hybrid vehicle having a propulsive electric motor energizable by a battery and an electric generator actuated by an internal combustion engine for energizing the propulsive electric motor.

2. Description of the Related Art

Growing concern in recent years over environmental protection has led to various efforts to develop for practical applications electric vehicles which have a propulsive electric motor energizable by a battery to transmit drive forces to drive wheels for propelling the electric vehicle. One of the important requirements for such electric vehicles to satisfy is that the range which they can travel without recharging the battery be maximized and the discharging of the battery be minimized for increased battery service life.

One solution disclosed in Japanese laid-open patent publication No. 3-169203 is a hybrid vehicle carrying an electric energy generating apparatus having an electric generator and an internal combustion engine for actuating the electric generator. Electric energy generated by the electric generator is supplied to charge a battery or to energize a propulsive electric motor.

While the disclosed hybrid vehicle is running, the battery energizes the electric generator to operate as an electric motor in a motor mode to start the engine. After the engine has been started, the electric generator is switched from the motor mode to a generator mode in which it is actuated by the engine to generate electric energy, and then the engine is warmed up. Thereafter, the electric generator is operated to generate an appropriate amount of electric energy depending on an operating condition of the hybrid vehicle, such as the vehicle speed of the hybrid vehicle, and the generated electric energy is supplied to the battery or the propulsive electric motor.

The electric generator is operated to generate the electric energy as follows: Depending on an operating condition of the hybrid vehicle, such as the vehicle speed of the hybrid vehicle, a target generated output for the electric generator is obtained from a predetermined data table or the like. Then, the engine is controlled to produce a power output (drive forces to actuate the electric generator) which corresponds to the target generated output. The engine is controlled by regulating, with an actuator or the like, the opening of a throttle valve (intake air control valve) of the engine into a throttle valve opening corresponding to the target generated output. The generated output of the electric generator is also increased or reduced into agreement with the target generated output by controlling an output current from the electric generator with an inverter circuit or the like. The above generator control process is carried out from time to time to cause the electric generator to generate an amount of electric energy depending on the operating condition of the hybrid vehicle.

When the above hybrid vehicle is decelerated, the propulsive electric motor is subjected to regenerative braking and operates as a generator to supply regenerated electric energy to the battery.

Therefore, if the hybrid vehicle is decelerated and the propulsive electric motor is subjected to regenerative braking when the electric energy generated by the electric generator is supplied to the propulsive electric motor and the battery during travel of the hybrid vehicle, then the electric energy generated by the electric generator is no longer supplied to the propulsive electric motor, but is supplied only to the battery. At this time, since an electric load on the generator drops sharply or is greatly reduced, a mechanical load on the engine which actuates the generator also drops sharply. As a result, the engine races, i.e., the rotational speed of the engine increases sharply, and the engine discharges unwanted exhaust emissions or suffers undue vibrations.

SUMMARY OF THE INVENTION

It is therefore an object of the present invention to provide an electric generation control system for use on a hybrid vehicle which is capable of preventing an engine of an electric energy generating apparatus on the hybrid vehicle from racing upon regenerative braking of a propulsive electric motor on the hybrid vehicle, for thereby preventing the engine from discharging unwanted exhaust emissions and suffering undue vibrations.

To accomplish the above object, there is provided in accordance with the present invention an electric generation control system for use on a hybrid vehicle having a vehicle propelling apparatus including a battery and a propulsive electric motor energizable by the battery, and an electric energy generating apparatus including an engine and a generator actuatable by the engine, the generator being operable in a generator mode in which when the vehicle propelling apparatus is in operation, the generator is actuated by the engine to generate electric energy to be supplied to the battery and/or the propulsive electric motor, and when the hybrid vehicle is decelerated, the propulsive electric motor is subjected to regenerative braking and regenerated electric energy produced thereby is supplied to the battery, said electric generation control system comprising target generated output setting means for determining a target generated output for the generator based on an operating condition of the hybrid vehicle, intake air control valve control means for controlling the opening of an intake air control valve of the engine to enable the engine to produce a power output corresponding to said target generated output, regenerative braking detecting means for detecting regenerative braking of the propulsive electric motor, and correcting means for correcting the opening of the intake air control valve of the engine depending on the target generated output in a direction to decrease when regenerative braking of the propulsive electric motor is detected by said regenerative braking detecting means.

The opening of the intake air control valve of the engine which actuates the generator is basically controlled by the intake air control valve control means to cause the engine to produce a power output corresponding to the target generated output which is determined by the target generated output setting means based on the operating condition of the hybrid vehicle. When regenerative braking of the propulsive electric motor is detected by the regenerative braking detecting means, the opening of the intake air control valve is corrected in a direction to decrease by the correcting means. Therefore, even when the load on the engine drops sharply or is greatly reduced by regenerative braking of the propulsive electric motor, the engine is prevented from racing.

Consequently, when an electric load on the generator drops sharply upon regenerative braking, causing a sharp drop of the load on the engine, the rotational speed of the engine is prevented from increasing sharply, i.e., the engine is prevented from racing. Therefore, the engine is prevented from discharging unwanted exhaust emissions and also from suffering undue vibrations.

The target generated output is determined depending on the vehicle speed of the hybrid vehicle. In this manner, the generator is caused to produce a generated output commensurate with the amount of electric energy consumed by the propulsive electric motor which corresponds to the vehicle speed of the hybrid vehicle, and the generated output is supplied to the battery and the propulsive electric motor. The consumption by the propulsive electric motor of electric energy supplied from the battery is now suppressed to an appropriate level.

Immediately after the engine and the generator have been started, the generator generates electric energy while the engine is being warmed up in order to prevent an excessive load from being imposed on the engine when the engine is not sufficiently warm. In the warm-up of the engine, a target generated output for the generator is determined depending on the temperature of the engine. This permits the generator to generate electric energy while the engine is being warmed up with the load on the engine being optimized for the warming-up operation of the engine. After the engine has been warmed up, a target generated output is determined depending on the vehicle speed of the hybrid vehicle. Therefore, the generator is caused to produce a generated output commensurate with the amount of electric energy that is consumed by the propulsive electric motor.

When the intake air control valve is controlled by the intake air control valve control means, a target rotational speed for the engine to produce a power output from the engine corresponding to the target generated output is determined, and the opening of the intake air control valve is controlled to equalize the rotational speed of the engine to the target rotational speed. The engine is now controlled to produce a power output corresponding to the target generated output for the generator.

The propulsive electric motor is subjected to regenerative braking when the hybrid vehicle is decelerated by reducing the operation of the accelerator or braking the hybrid vehicle while the hybrid vehicle is running. After the operation of the accelerator is reduced or the hybrid vehicle is braked, regenerative braking of the propulsive electric motor starts being carried out. The regenerative braking detecting means detects regenerative braking of the propulsive electric motor when the operation of the accelerator of the hybrid vehicle is detected or the hybrid vehicle is braked, for example. Immediately before the propulsive electric motor starts to undergo regenerative braking, the opening of the intake air control valve is corrected in a direction to decrease by the correcting means. Accordingly, even when the load on the engine drops sharply at the same time that the propulsive electric motor starts to undergo regenerative braking, since the opening of the intake air control valve has been reduced immediately before, the engine is reliably prevented from racing. When the opening of the intake air control valve is corrected in a direction to decrease immediately before the propulsive electric motor starts to undergo regenerative braking, the opening of the intake air control valve is corrected by a predetermined amount, for example.

The electric generation control system further comprises regenerated current detecting means for detecting a regenerated current flowing from the propulsive electric motor to the battery, and the regenerative braking detecting means comprises means for detecting regenerative braking of the propulsive electric motor when a regenerated current is detected by said regenerated current detecting means.

The degree by which the load on the engine is reduced by regenerative braking of the propulsive electric motor depends on the amount of regenerated electric energy produced by the propulsive electric motor. According to the present invention, furthermore, the amount of regenerated electric energy is determined based on the regenerated current detected by said regenerated current detecting means, and a corrective value for the opening of the intake air control valve is established depending on the amount of regenerated electric energy determined by said regenerated energy calculating means. The opening of the intake air control valve is corrected by the corrective value established by said corrective value setting means.

With the above arrangement, during regenerative braking of the propulsive electric motor, the opening of the intake air control valve can be accurately corrected depending on the degree by which the load on the engine is reduced by regenerative braking of the propulsive electric motor. The operating condition of the engine at the time the generator generates electric energy is kept stable depending on the load on the engine. The engine is thus reliably prevented from discharging undesirable exhaust emissions and suffering undue vibrations.

The corrective value setting means establishes a greater corrective value for the opening of the intake air control valve as the amount of regenerated electric energy produced by the propulsive electric motor is greater.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 13 is a flowchart of a generator switching control mode of operation of the electric energy generating apparatus of the hybrid vehicle shown in FIG. 1;

FIG. 23 is a flowchart of an operation sequence of the electric energy generating apparatus of the hybrid vehicle shown in FIG. 1.

DETAILED DESCRIPTION OF THE PREFERRED EMBODIMENT

Figure 1:
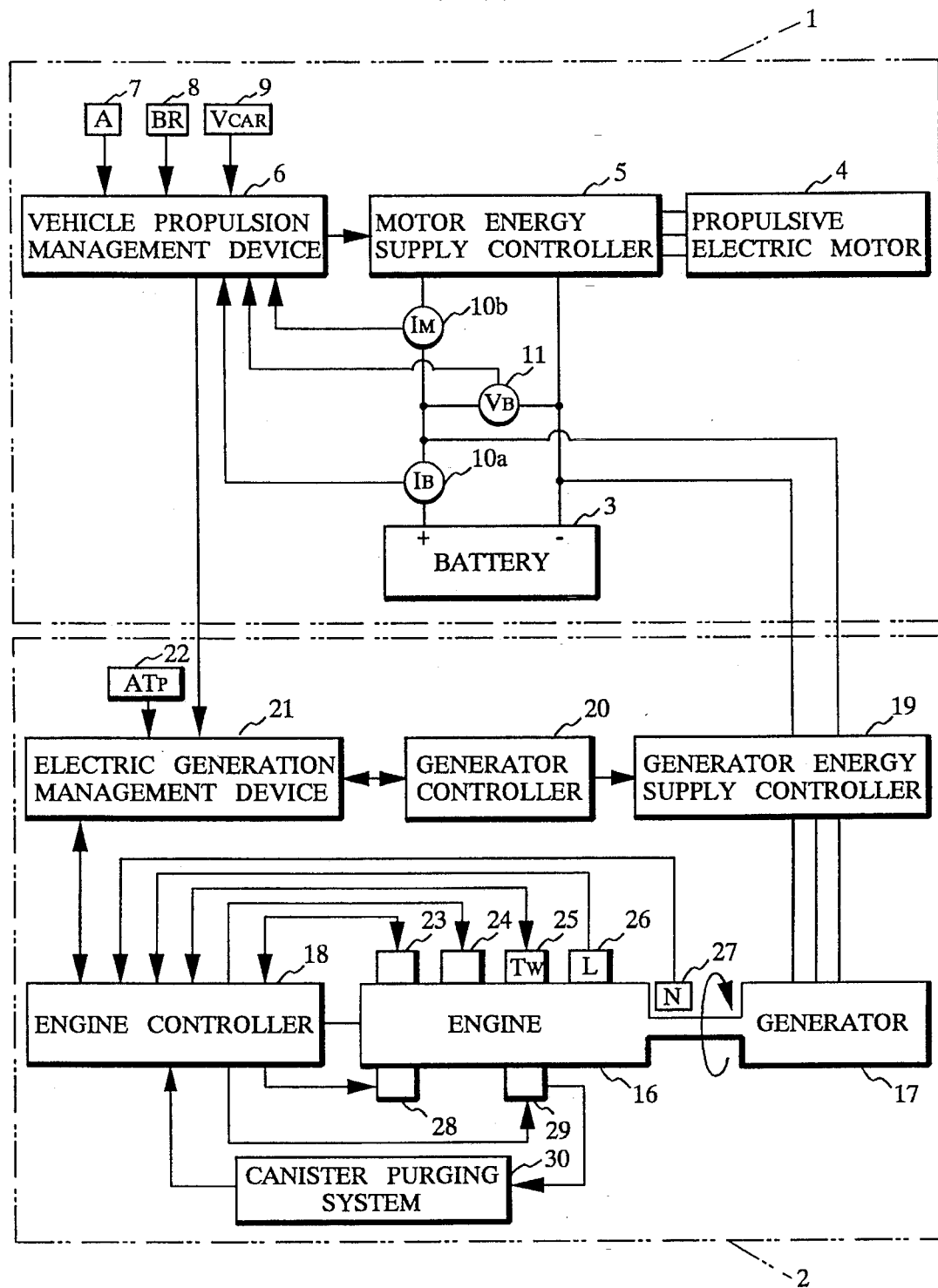
FIG. 1 is a block diagram of a system arrangement of a hybrid vehicle to which the present invention is applied.

As shown in FIG. 1, the system arrangement of a hybrid vehicle to which the present invention is applied generally includes a vehicle propelling apparatus 1 and an electric energy generating apparatus 2.

The vehicle propelling apparatus 1 comprises a battery 3, a propulsive electric motor 4 energizable by the battery 3, a motor energy supply controller 5 including an inverter circuit, etc. (not shown) for controlling the supply of electric energy between the battery 3 and the propulsive electric motor 4, a vehicle propulsion management device 6 for controlling the propulsive electric motor 4 through the motor energy supply controller 5 and recognizing the remaining capacity of the battery 3, an accelerator operation sensor 7 (accelerator operation detecting means) for detecting an accelerator operation A carried out by the driver of the hybrid vehicle, a brake switch 8 (braking detecting means) for detecting whether the driver has applied a braking action or not, a vehicle speed sensor 9 for detecting a vehicle speed $V_{CAR}$, a current sensor 10a for detecting a discharged current and a charged current (hereinafter referred to as a "battery current $I_B$") of the battery 3, a current sensor 10b (regenerated current detecting means) for detecting a current (hereinafter referred to as a "motor current $I_M$") of the propulsive electric motor 4, and a voltage sensor 11 for detecting a voltage (hereinafter referred to as a "battery voltage $V_B$") across the battery 3.

Figure 2:
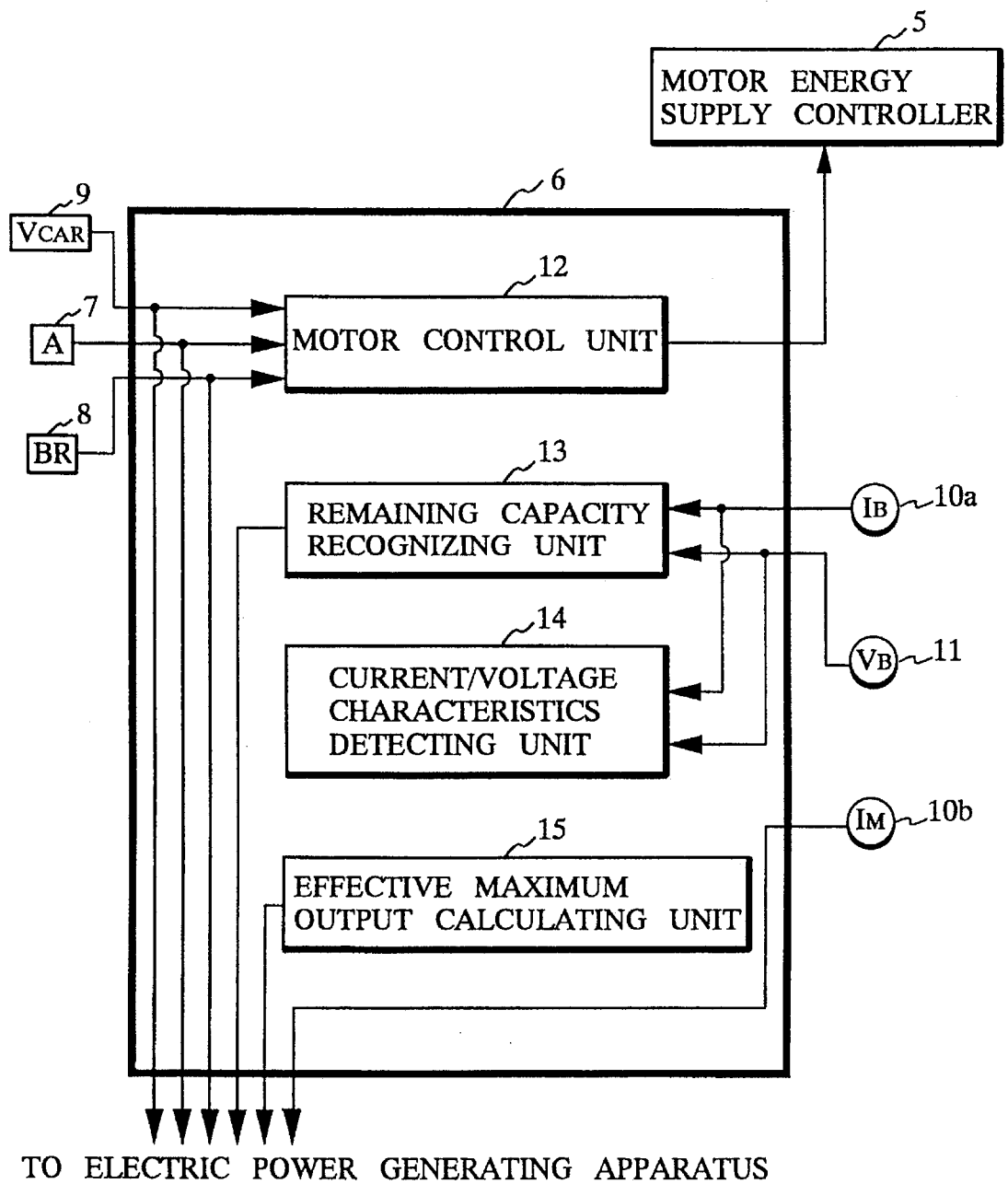
FIG. 2 is a block diagram of a portion of an electric energy generating apparatus of the hybrid vehicle shown in FIG. 1.

The vehicle propulsion management device 6 comprises a microcomputer or the like, and is programmed to perform various functions which include, as shown in FIG. 2, a motor control unit 12 for controlling the propulsive electric motor 4 through the motor energy supply controller 5 based on detected signals from the accelerator operation sensor 7, the brake switch 8, and the vehicle speed sensor 9, a remaining capacity recognizing unit 13 for recognizing the remaining capacity of the battery 3 based on detected signals from the current sensor 10a and the voltage sensor 11, a current/voltage characteristics detecting unit 14 for detecting present current/voltage characteristics of the battery 3 based on detected signals from the current sensor 10a and the voltage sensor 11, and an effective maximum output calculating unit 15 for determining an effective maximum output that can be produced by the battery 3 at a predetermined minimum drive voltage from the present current/voltage characteristics of the battery 3 which are detected by the current/voltage characteristics detecting unit 14.

Basically, the motor Control unit 12 determines a target torque for the propulsive electric motor 4 according to a preset map or the like based on the accelerator operation A and the vehicle speed $V_{CAR}$ which are detected by the accelerator operation sensor 7 and the vehicle speed sensor 9, and imparts the determined target torque to the motor energy supply controller 5. The motor energy supply controller 5 controls the supply of electric energy from the batter 3 to the propulsive electric motor 4 with switching pulses in order to enable the propulsive electric motor 4 to produced the given target torque.

When the accelerator operation A detected by the accelerator operation sensor 7 is reduced or an ON signal (hereinafter referred to as a "braking signal BR") indicative of a braking action is supplied from the brake switch 8 while the hybrid vehicle is running, the motor control unit 12 instructs the motor energy supply controller 5 to effect regenerative braking on the propulsive electric motor 4. At this time, the motor energy supply controller 5 supplies a regenerated current from the propulsive electric motor 4 to the battery 3, thereby charging the battery 3. The regenerated current from the propulsive electric motor 4 is detected by the current sensor 10b as a motor current $I_M$ that flows from the motor energy supply controller 5 to the battery 3.

Basically, the remaining capacity recognizing unit 13 integrates the product of the battery current $I_B$ and the battery voltages $V_B$, i.e., the electric energy, which are detected respectively by the current sensor 10 and the voltage sensor 11 at each sampling time for thereby determining discharged and charged amounts of electric energy of the battery 3, and subtracts the discharged amount of electric energy from and adds the charged amount of electric energy to the initial capacity of the battery 3 for thereby recognizing the remaining capacity C of the battery 3 from time to time.

Figure 4:
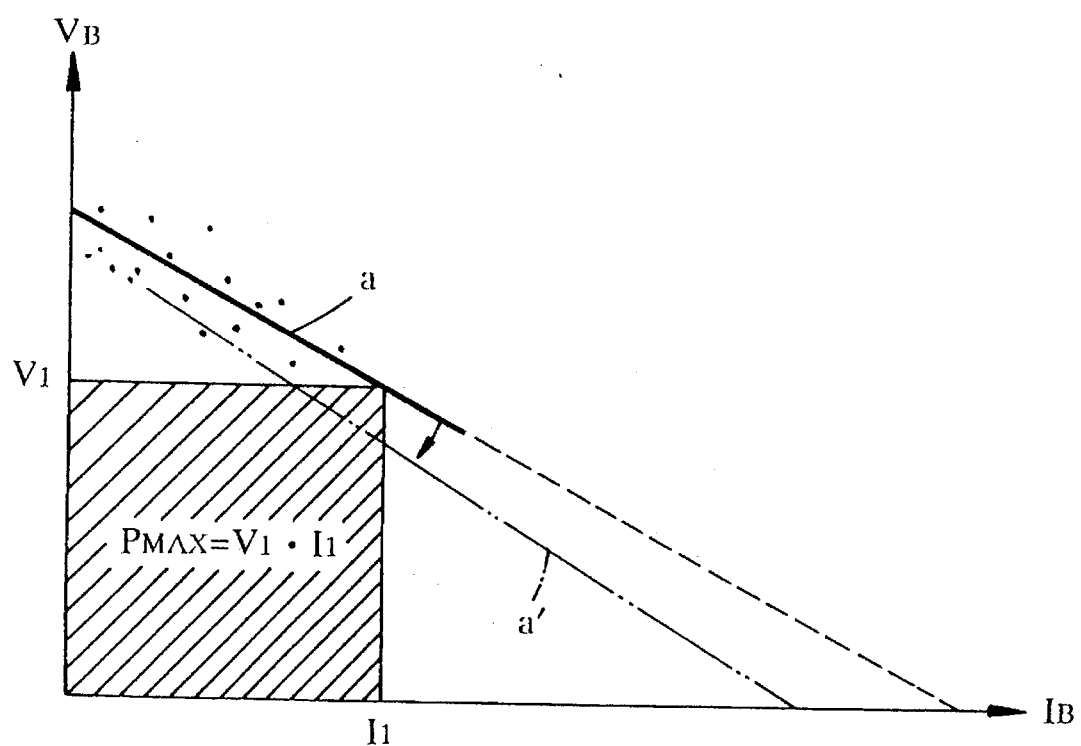
FIG. 4 is a diagram showing the manner in which the electric energy generating apparatus of the hybrid vehicle shown in FIG. 1 operates.

The current/voltage characteristics detecting unit 14 stores a plurality of sets of the battery current $I_B$ and the battery voltages $V_B$ detected at respective sampling times in a memory (not shown) within a predetermined period of time that is longer than the sampling times. Then, as shown in FIG. 4, the current/voltage characteristics detecting unit 14 determines a linear characteristic curve "a" representing the present current/voltage characteristics of the battery 3 from the stored sets of the battery current $I_B$ and the battery voltages $V_B$ according to the method of least squares or the like.

The effective maximum output calculating unit 15 determines, from the linear characteristic curve "a", a current $I_1$ at a minimum-drive voltage $V_1$ (see FIG. 4) required to drive the propulsive electric motor 4, i.e., a current $I_1$ that is discharged by the battery 3 when the voltage across the battery 3 is the minimum drive voltage $V_1$. Then, the effective maximum output calculating unit 15 determines the product V of the current $I_1$ and the minimum drive voltage $V_1$ as an effective maximum output $P_{MAX}$ which is indicated as a hatched area in FIG. 4. When the remaining capacity C of the battery 3 is reduced, the linear characteristic curve "a" moves downwardly as indicated by a hypothetical curve "a" in FIG. 4. Therefore, the effective maximum output $P_{MAX}$ is reduced as the remaining capacity C of the battery 3 is lowered.

The remaining capacity C of the battery 3, the effective maximum output $P_{MAX}$, the vehicle speed $V_{CAR}$ detected by the vehicle speed sensor 9, the accelerator operation A detected by the accelerator operation sensor 7, the braking signal BR from the brake switch 8, and the motor current $I_M$ detected by the current sensor 10b are supplied to an electric generation management device (described below) of the electric energy generating apparatus 2.

Drive forces generated by the propulsive electric motor 4 are transmitted through a power transmitting system (not shown) to drive wheels of the hybrid vehicle, thereby propelling the hybrid device.

In FIG. 1, the electric energy generating apparatus 2 comprises an internal combustion engine 16, an electric generator 17 which can be actuated by the engine 16, an engine controller 18 for controlling the engine 16 and auxiliary components (described later) combined therewith, a generator energy supply controller 19 including an inverter circuit (not shown), etc. for controlling the supply of electric energy between the battery 3 and the propulsive electric motor 4 or the generator 17, a generator controller 20 for controlling the generator 17 through the generator energy supply controller 19, an electric generation management device 21 for managing and controlling the electric energy generating apparatus 2 through the engine controller 18 and the generator controller 20, and an atmospheric pressure sensor 22 for detecting an atmospheric pressure $At_p$.

The generator 17 has a rotor (not shown) coupled to the crankshaft (not shown) of the engine 16 so that the rotor will rotate at the same speed as the crankshaft.

The engine 16 is combined with auxiliary components which include an exhaust gas sensor 23, an exhaust gas purifying catalyst 24, a temperature sensor 25 for detecting a temperature $T_W$ of the engine 16, i.e., a coolant temperature, a load detector 26 for detecting a load L on the engine 16, i.e., a load torque on the crankshaft of the engine 16, a engine speed sensor 27 for detecting a rotational speed of the engine 16, i.e., a rotational speed of the generator 17, a throttle actuator 28 for actuating a throttle valve (not shown) of the engine 16, a fuel supply device 29 for supplying fuel to the engine 16, and a canister purging system 30 for purging a canister (not shown) associated with the fuel supply device 29. The exhaust gas purifying catalyst 24 comprises a catalyst which can be activated when it is heated by an electric current supplied thereto. When the canister needs to be purged, the canister purging system 30 applies a canister purge request signal to the engine controller 18, through which the purge request signal is supplied to the electric generation management device 21. The canister is purged to lower the vapor pressure of a fuel gas that is stored in the canister for thereby improving the exhaust gas emission performance of the engine 16. The canister is purged when the engine 16 is temporarily in operation.

The electric generation management device 21, the engine controller 18, and the generator controller 20 comprise a microcomputer or the like, and are programmed to perform various functions described below.

Figure 3:
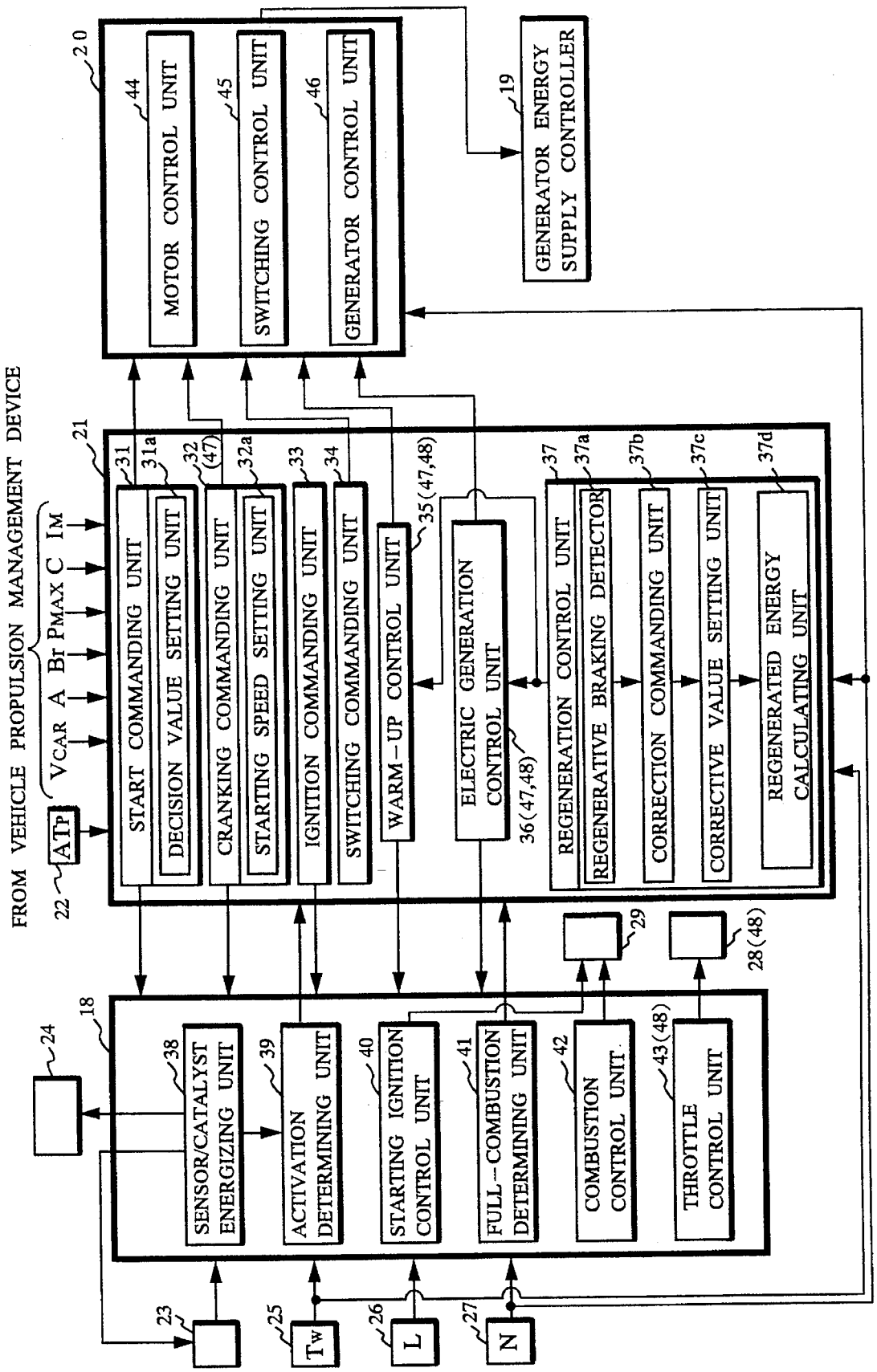
FIG. 3 is a block diagram of a portion of the electric energy generating apparatus of the hybrid vehicle shown in FIG. 1.

As shown in FIG. 3, the electric generation management device 21 comprises a start commanding unit 31 for issuing a start signal to the engine controller 18 and the generator controller 20 to activate the electric energy generating apparatus 2, a cranking commanding unit 32 for cranking the engine 16 to start through the engine controller 18 and the generator controller 20, an ignition commanding unit 33 for igniting fuel in the engine 16 through the engine controller 18 when the engine 16 is cranked, a switching commanding unit 34 for switching the generator 17 from a motor mode in which it operates as a starter motor to crank the engine 16 to a generator mode in which the generator 17 operates as a generator, through the generator controller 20, a warm-up control unit 35 for controlling the engine 16 and the generator 17 to operate through the engine controller 18 and the generator controller 20 when the engine 16 is warming up after it has started, an electric generation control unit 36 for controlling electric generation by the engine 16 and the generator 17 through the engine controller 18 and the generator controller 20 after the engine 16 has been warmed up, and a regeneration control unit 37 for controlling electric generation by the engine 16 and the generator 17 through the electric generation control unit 36 and the warm-up control unit 35 upon regenerative braking on the propulsive electric motor 4. The start commanding unit 31 has a threshold value setting unit 31a for establishing a threshold value for the remaining capacity C of the battery 3 which determines the timing to start the electric energy generation apparatus 2. The cranking commanding unit 32 has a starting rotational speed setting unit 32a for establishing a starting rotational speed for the engine 16, i.e., a starting rotational speed for the generator 17, when the engine 16 is cranked. The regeneration control unit 37 has a regenerative braking detector 37a for detecting regenerative braking on the propulsive electric motor 4 based on a regenerated current detected by the current sensor 10b, a correction commanding unit 37b (correcting means) for correcting the throttle opening of the engine 16 through the electric generation control unit 36 and the warm-up control unit 35 based on the detection of regenerative braking, a corrective value setting unit 37c (corrective value setting means) for establishing a corrective value for the throttle opening, and a regenerated energy calculating unit 37d (regenerated energy calculating means) for determining an amount of regenerated electric energy produced upon regenerative braking on the propulsive electric motor 4.

The electric generation management device 21 is supplied with various detected signals, including a detected signal indicative of the remaining capacity C of the battery 3, from the vehicle propulsion management device 6, and also a detected signal from the atmospheric pressure sensor 22. The electric generation management device 21 is further supplied with detected signals from the temperature sensor 25 and the engine speed sensor 27. Based on the supplied signals, the electric generation management device 21 manages and controls the electric energy generation apparatus 2 as described in detail later on.

The engine controller 18 comprises a sensor/catalyst energizing unit 38 for energizing and activating the exhaust gas sensor 23 and the exhaust gas purifying catalyst 24 based on a start signal issued from the start commanding unit 31, an activation determining unit 39 (activation determining means) for determining whether the exhaust gas sensor 23 and the exhaust gas purifying catalyst 24 have been activated or not and imparting a determined signal to the electric generation management device 21, a starting ignition control unit 40 for controlling the ignition of fuel in the engine 16 upon start of the engine 16 through the fuel supply device 29 and an ignition device (not shown) based on an ignition command from the ignition commanding unit 33, a full-combustion determining unit 41 (full-combustion determining means) for determining whether the combustion of fuel in the engine 16 has reached a fully combusted state when the engine 16 is ignited, and imparting a determined signal to the electric generation management device 21, a combustion control unit 42 for controlling the combustion of fuel in the engine 16 through the fuel supply device 29 based on command signals from the warm-up control unit 35 and the electric generation control unit 36, and a throttle control unit 43 for controlling the opening of throttle valves of the engine 16 through the throttle actuator 28 based on command signals from the cranking commanding unit 32, the warm-up control unit 35, the electric generation control unit 36 when the engine 16 is cranked, warming up, or subsequently operated.

The engine controller 18 is supplied with command signals from the electric generation management device 21 and detected signals from the exhaust gas sensor 23, the temperature sensor 25, the load detector 26, and the engine speed sensor 27. Based on the supplied signals, the engine controller 18 controls the engine 16 as described in detail later on.

The generator controller 20 comprises a motor control unit 44 for operating the generator 17 as a starter motor for the engine 16 through the generator energy supply controller 19 based on a command signal from the cranking commanding unit 32, a switching control unit 45 for switching the generator 17 from the motor mode to the generator mode through the generator energy supply controller 19 based on a command signal from the switching commanding unit 34, and a generator control unit 46 for controlling electric generation by the generator 17 through the generator energy supply controller 19 based on a command signal from the warm-up control unit 35 and the electric generation control unit 36.

The generator controller 20 is supplied with a detected signal from the engine speed sensor 27 through the engine controller 18 as well as command signals from the electric generation management device 21. Based on the supplied signals, the generator controller 20 controls the generator 17 through the generator energy supply controller 19 as described in detail later on.

The electric generation control unit 36 and the warm-up control unit 35 of the electric generation management device 21 jointly serve as target generated output setting means 47 for determining a target generated output to be produced by the generator 17 when the generator 17 generates electric energy. The throttle control unit 43 of the engine controller 18, the throttle actuator 28, the electric generation control unit 36, and the warm-up control unit 35 jointly serve as an intake air control valve control means 48.

Operation of the electric energy generating apparatus 2 of the hybrid vehicle will be described below.

Figure 5:
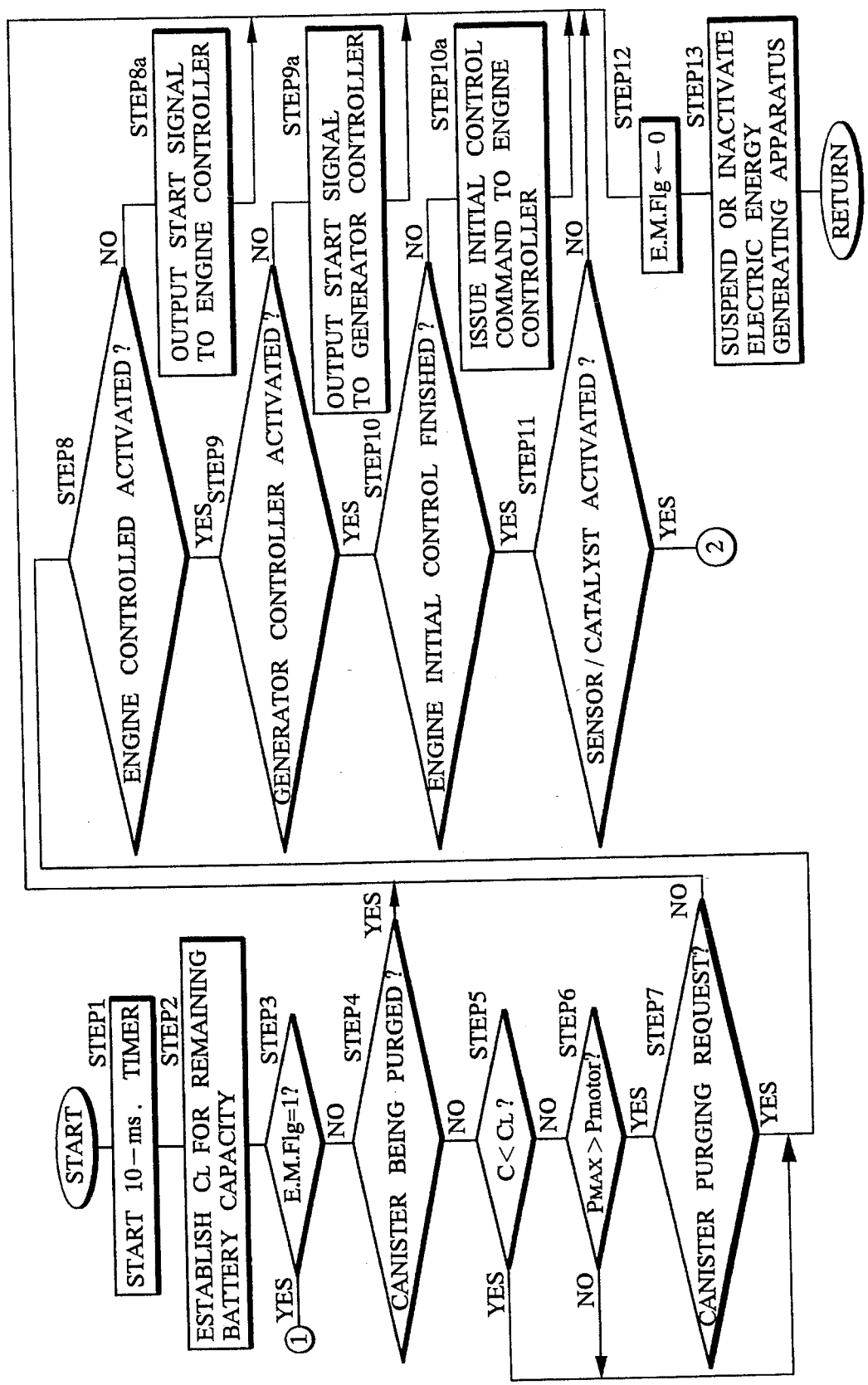
FIGS. 5 and 6 are flowcharts of an operation sequence of the electric energy generating apparatus of the hybrid vehicle shown in FIG. 1.
Figure 6:
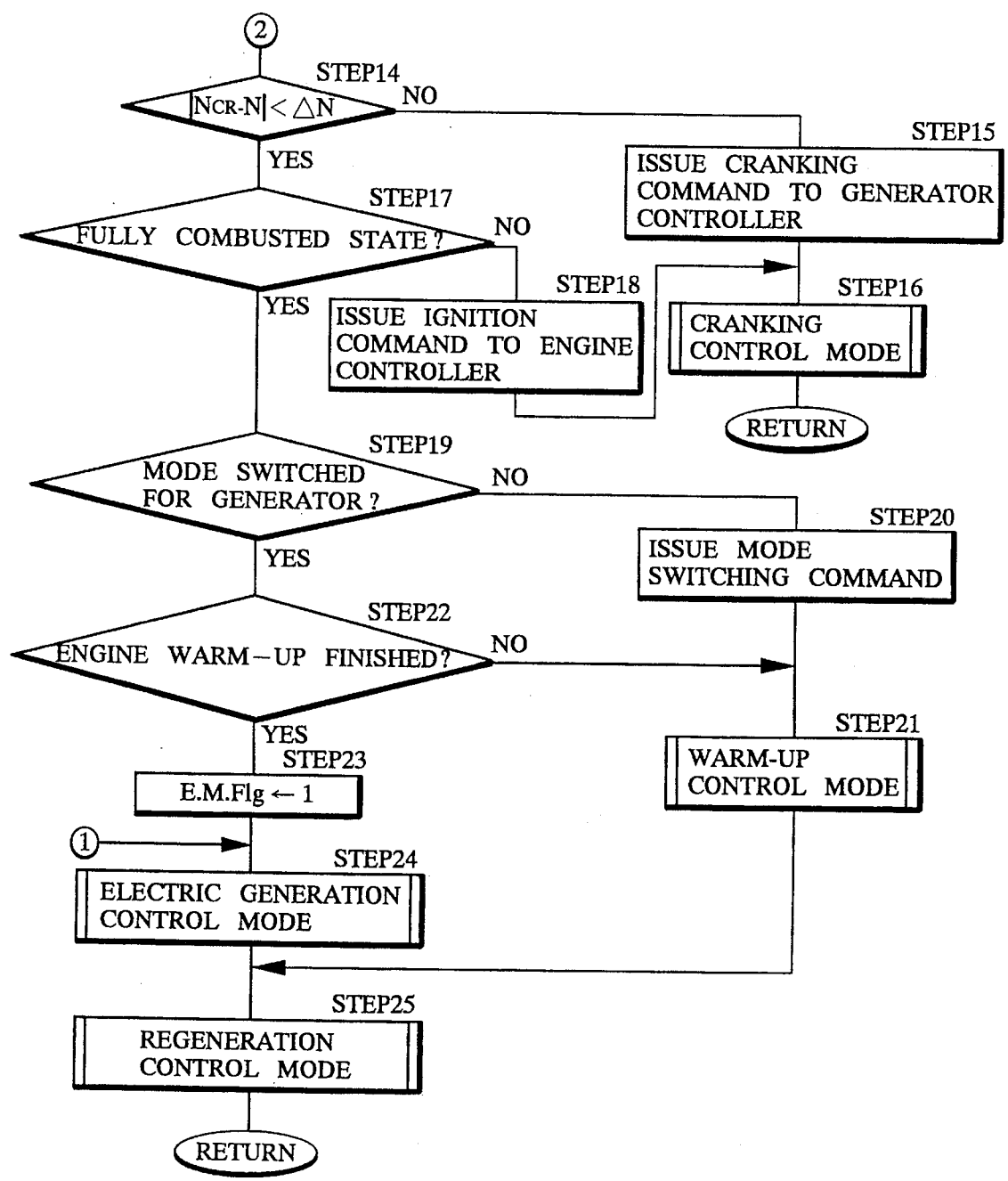

While the vehicle propelling apparatus 1 is in operation, e.g., while the hybrid vehicle is running or temporarily stopping, the electric generation management device 21 carries out a routine shown in FIGS. 5 and 6 in every cycle time of 10 milliseconds., for example.

Figure 7:
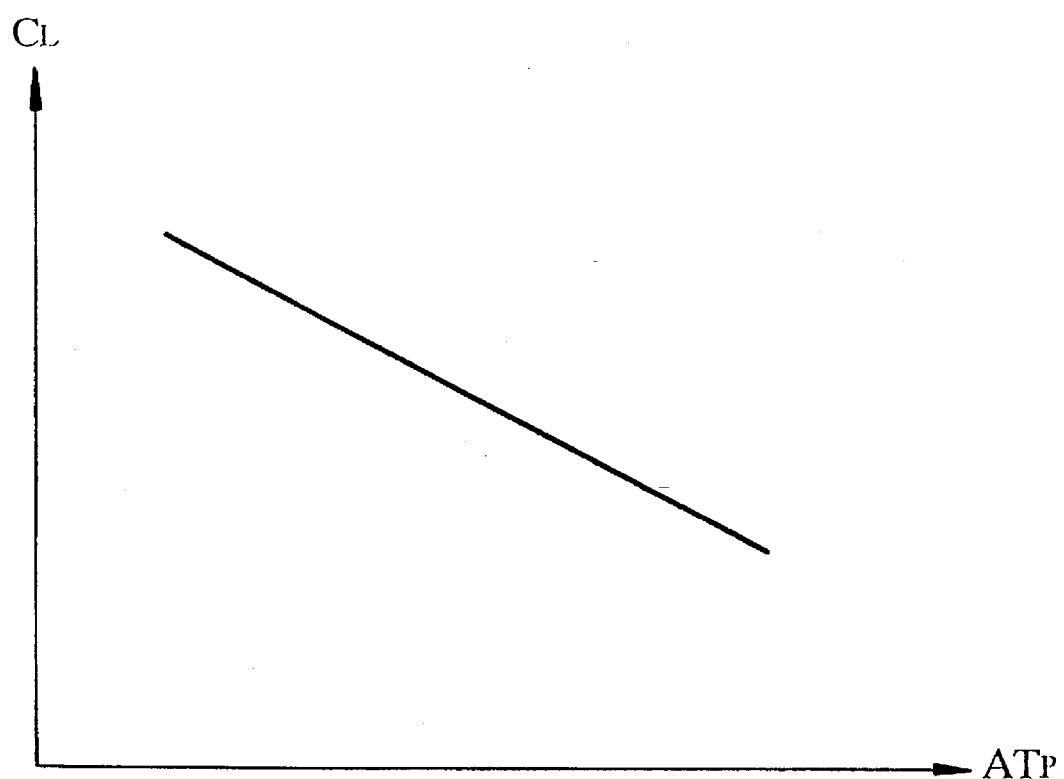
FIG. 7 is a diagram showing the manner in which the electric energy generating apparatus of the hybrid vehicle shown in FIG. 1 operates.

As shown in FIG. 5, the electric generation management device 21 first starts a 10-ms. timer in a STEP 1, and then the threshold value setting unit 31a establishes a threshold value $C_L$ for the remaining capacity C of the battery 3 in a STEP 2. The threshold value $C_L$ is used to determine whether the electric energy generating apparatus 2 is to be activated or not. Specifically, the threshold value setting unit 31a establishes the threshold value $C_L$ according to a predetermined data table as shown in FIG. 7 depending on the present atmospheric pressure $At_p$ detected by the atmospheric pressure sensor 22. As shown in FIG. 7, the threshold value $C_L$ is higher as the detected atmospheric pressure $At_p$ is lower. Under the atmospheric pressure in a plain geographic region, the threshold value $C_L$ is set to 20% of the full battery capacity which is 100% when the battery 3 is fully charged. In a highland where the atmospheric pressure is lower than the atmospheric pressure in a plain geographic region, the threshold value $C_L$ is set to a value higher than 20%, e.g., 40% of the full battery capacity.

After having established the threshold value $C_L$, the electric generation management device 21 carries out decision STEPs 3~10, and activates the engine controller 18 depending on the results of the decision STEPs 3~10.

Specifically, the electric generation management device 21 determines whether an E.M.Flg (Energy Management Flag) is "1" or "0" in a STEP 3. The E.M.Flg indicates whether a electric energy generation control mode (described later on) has been carried out or not. The E.M.Flg is "1" if the electric energy generation control mode has been carried out, and "0" if the electric energy generation control mode has not been carried out. If the E.M.Flg is "1" in the STEP 3 (YES), then the electric energy generation control mode is continuously carried out.

If the E.M.Flg is "0" in the STEP 3 (NO), then the electric generation management device 21 determines whether the canister is being purged or not in a STEP 4. If the canister is being purged (at this time, the engine 16 is controlled by the engine controller 18 under the command from the canister purging system 30), then electric generation management device 21 resets the E.M.Flg to "0" in a STEP 12, and thereafter suspends or inactivates the electric energy generating apparatus 2 in a STEP 13. Specifically in the STEP 13, the supply of electric energy from the generator 17 to the battery 3 and the propulsive electric motor 4 is stopped or suspended, but the engine 16 is controlled by the canister purging system 30.

If the canister is not being purged in the STEP 4 (NO), then the electric generation management device 21 compares the present remaining capacity C of the battery 3 which is recognized by the remaining capacity recognizing unit 13 with the established threshold value $C_L$ in a STEP 5. If $C \geq C_L$, i.e., if the remaining capacity C of the battery 3 is not substantially lowered, then the electric generation management device 21 compares the present effective maximum output $P_{MAX}$ of the battery 3 which is determined by the effective maximum output calculating unit 15 with a predetermined required maximum output $P_{motor}$ for the propulsive electric motor 4, i.e., a power output of the propulsive electric motor 4 which is required when the accelerator operation A is maximum, in a STEP 6.

If $C < C_L$ or $P_{MAX} \leq P_{motor}$, i.e., if remaining capacity C of the battery 3 is substantially lowered or the battery 3 is incapable of producing an energy output necessary to propel the hybrid vehicle, then the start commanding unit 31 of the electric generation management device 21 applies start signals successively to the engine controller 18 and the generator controller 20 to activate them in STEPs 8, 8a, 9, 9a. When the engine controller 18 is activated, the sensor/catalyst energizing unit 38 starts energizing and activating the exhaust gas sensor 23 and the exhaust gas purifying catalyst 24, and simultaneously the activation determining unit 39 starts determining whether the exhaust gas sensor 23 and the exhaust gas purifying catalyst 24 have been activated or not. Specifically, the activation determining unit 39 determines whether the exhaust gas sensor 23 and the exhaust gas purifying catalyst 24 have been energized by the sensor/catalyst energizing unit 38 for respective periods of time in excess of preset periods of time, or the temperatures of the exhaust gas sensor 23 and the exhaust gas purifying catalyst 24 have exceeded respective preset temperatures. When the exhaust gas sensor 23 and the exhaust gas purifying catalyst 24 have been energized for respective periods of time in excess of preset periods of time, or the temperatures of the exhaust gas sensor 23 and the exhaust gas purifying catalyst 24 have exceeded respective preset temperatures, the activation determining unit 39 determines that both the exhaust gas sensor 23 and the exhaust gas purifying catalyst 24 have been activated, and outputs a signal indicative of their activation to the electric generation management device 21.

After having activated the engine controller 18 and the generator controller 20, the electric generation management device 21 instructs the engine controller 18 to effect an initial control process for operating the engine 16 in STEPs 10, 10a. After the initial control process, the electric generation management device 21 determines whether the exhaust gas sensor 23 and the exhaust gas purifying catalyst 24 have been activated or not based on a signal from activation determining unit 39 in a STEP 11.

If $C \geq C_L$ and $P_{MAX} > P_{motor}$ in the STEPs 5, 6, i.e., if the battery 3 has a sufficient remaining capacity, then the electric generation management device 21 determines whether there is a canister purge request signal from the canister purging system 30 or not in a STEP 7. If there is no canister purge request signal, then the electric energy generating apparatus 2 is suspended or inactivated in the STEPs 12, 13. If there is a canister purge request signal from the canister purging system 30 in the STEP 7 (YES), then the electric generation management device 21 activates the engine controller 18 for enabling the canister purging system 30 to purge the canister.

As described above, if the remaining capacity C of the battery 3 is substantially lowered ($C < C_L$) or the battery 3 is incapable of producing an energy output necessary to propel the hybrid vehicle ($P_{MAX} \leq P_{motor}$) while the vehicle propelling apparatus 1 is in operation, then except when the canister is being purged, the engine controller 18 and the generator controller 20 are activated by the start commanding unit 31 of the electric generation management device 21, and the exhaust gas sensor 23 and the exhaust gas purifying catalyst 24 are energized and activated by the sensor/catalyst energizing unit 38.

Because the threshold value $C_L$ for remaining capacity C of the battery 3 is greater as the ambient atmospheric pressure $AT_p$ is lower, the engine controller 18 is activated earlier in a highland where the atmospheric pressure $AT_p$ is relatively low than in a plain geometrical region.

If the exhaust gas sensor 23 and the exhaust gas purifying catalyst 24 have been activated as confirmed by a signal from activation determining unit 39 in the STEP 11 (YES), the electric generation management device 21 determines whether the difference $|N_{CR}-N|$ between a starting rotational speed $N_{CR}$ (cranking rotational speed $N_{CR}$) established by the starting rotational speed setting unit 32a for the engine 16 and a present rotational speed N (=a rotational speed of the generator 17) of the engine 16 detected by the engine speed sensor 27 is smaller than a predetermined value $\Delta N$ or not, i.e., if the present rotational speed N of the engine 16 substantially agrees with the starting rotational speed $N_{CR}$ or not, in a STEP 14 (see FIG. 6). If $|N_{CR}-N| \geq \Delta N$, i.e., if the engine 16 and the generator 17 are inactivated or the engine 16 has just begun to be cranked, then the cranking commanding unit 32 issues a cranking command to the generator controller 20 to crank the engine 16 in a STEP 15, and carries out a cranking control mode in which the engine 16 is cranked by the generator 17 as a starter motor in a STEP 16.

Figure 8:
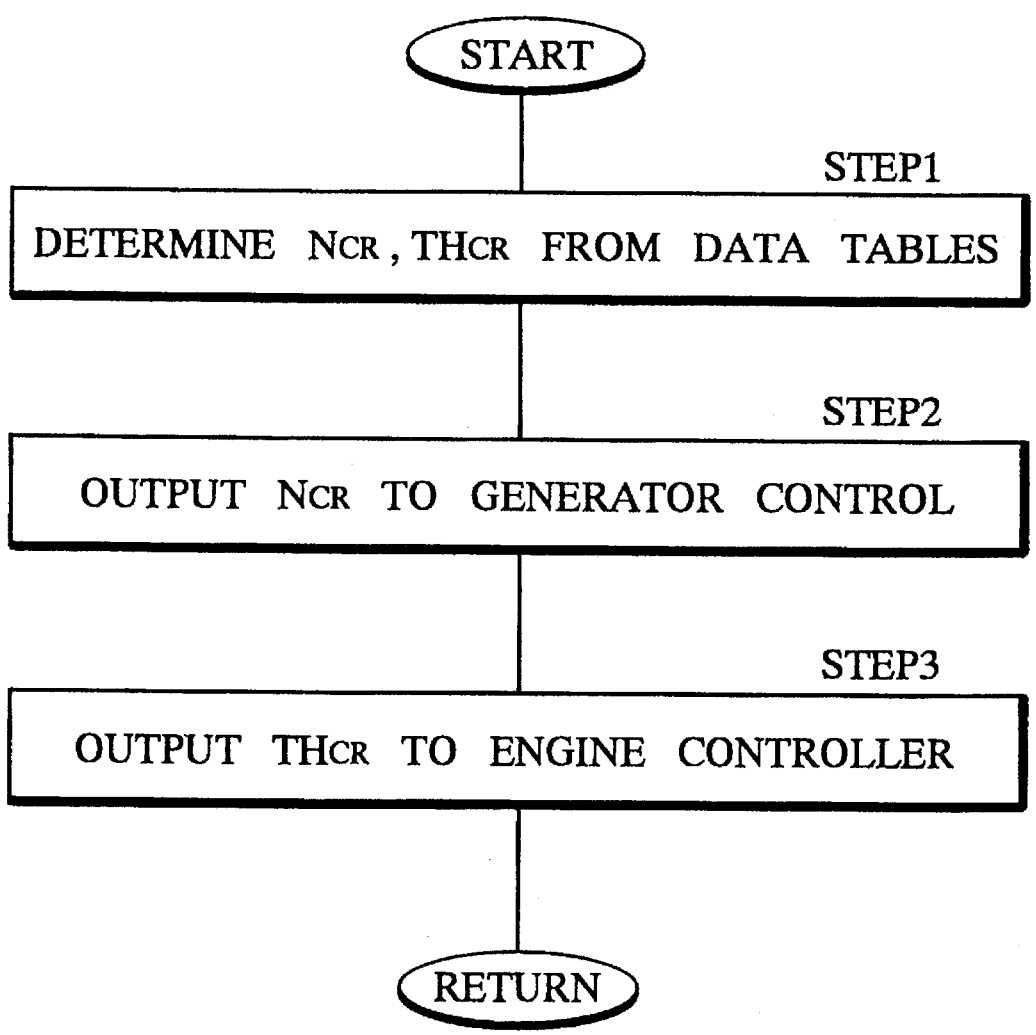
FIG. 8 is a flowchart of a cranking control mode of operation of the electric energy generating apparatus of the hybrid vehicle shown in FIG. 1.

The cranking control mode in the STEP 16 is effected by the cranking commanding unit 32 as shown in FIG. 8.

Figure 9:
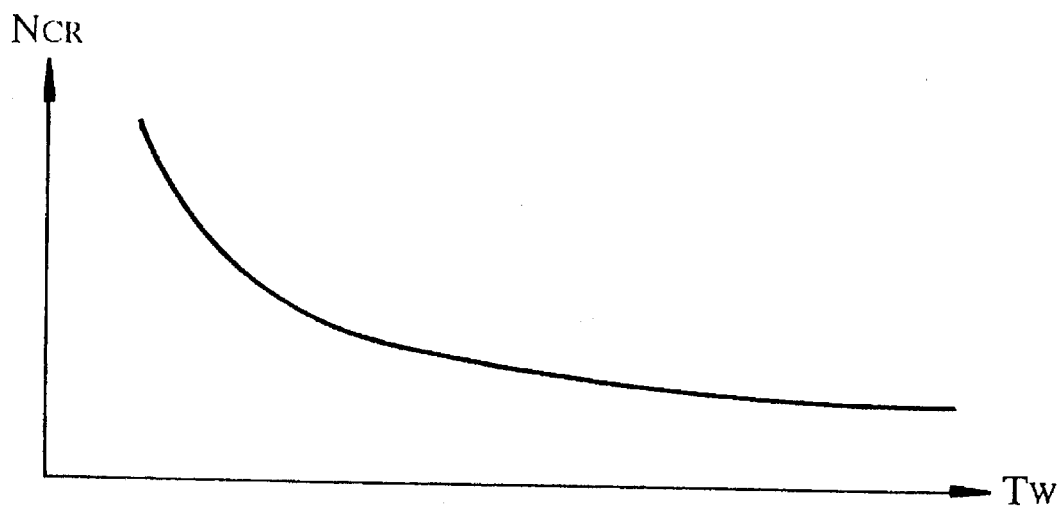
FIG. 9 is a diagram showing the manner in which the electric energy generating apparatus of the hybrid vehicle shown in FIG. 1 operates in the cranking control mode.
Figure 10:
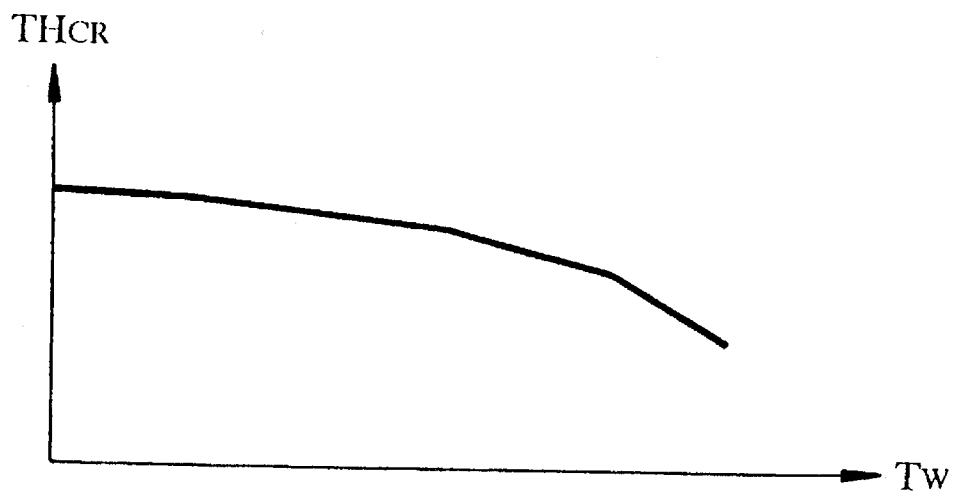
FIG. 10 is a diagram showing the manner in which the electric energy generating apparatus of the hybrid vehicle shown in FIG. 1 operates in the cranking control mode.

In the cranking control mode shown in FIG. 8, the starting rotational speed setting unit 32a of the cranking commanding unit 32 determines a target starting rotational speed $N_{CR}$ from a data table shown in FIG. 9 based on a present engine temperature $T_W$ of the engine 16 which is detected by the temperature sensor 25, and determines a target throttle opening $TH_{CR}$ for the engine 16 from a data table shown in FIG. 10 in a STEP 1. The data tables shown in FIGS. 9 and 10 contain predetermined different target starting rotational speeds $N_{CR}$ and predetermined different target throttle openings $TH_{CR}$, respectively, corresponding to various engine temperatures $T_W$ of the engine 16 for better exhaust gas characteristics of the engine 16.

The cranking commanding unit 32 outputs the determined target starting rotational speed $N_{CR}$ and the determined target throttle opening $TH_{CR}$ respectively to the generator controller 20 and the engine controller 18 in respective STEPs 2, 3.

At this time, the motor control unit 44 of the generator controller 20 determines, according to a given formula, a command value for a motor current necessary to bring the present rotational speed N of the generator 17 (=the rotational speed of the engine 16) into agreement with the target starting rotational speed $N_{CR}$ when the generator 17 operates as an electric motor, and gives the determined command value to the generator energy supply controller 19. Based on the given command value, the generator energy supply controller 19 adjusts the duty cycle of switching pulses for controlling the electric energy supplied from the battery 3 to the generator 17. In this manner, the electric energy supplied from the battery 3 to the generator 17 which operates as an electric motor is controlled by a feedback loop until the rotational speed N of the generator 17 agrees with the target starting rotational speed $N_{CR}$.

The throttle control unit 43 of the engine controller 18 controls the throttle opening of the engine 16 through the throttle actuator 28 until the throttle opening of the engine 16 agrees with the target throttle opening $TH_{CR}$.

If $|N_{CR}-N| < \Delta N$ in the STEP 14 (YES) as a result of the cranking control mode shown in FIG. 8, i.e., if the rotational speed N of the generator 17 substantially agrees with the target starting rotational speed $N_{CR}$, then the electric generation management device 21 determines whether the combustion of fuel in the engine 16 has reached a fully combusted state or not based on a signal issued from the full-combustion determining unit 41 in a STEP 17. If not, the electric generation management device 21 imparts an ignition command to the engine controller 18 to ignite fuel in the engine 16 in a STEP 18.

At this time, the starting ignition control unit 40 controls the fuel supply unit 29 to start supplying fuel to the engine 16, and also controls the non-illustrated ignition device to ignite fuel in the engine 16, starting to combust fuel in the engine 16. The starting ignition control unit 40 controls the fuel supply unit 29 to supply fuel to the engine 16 while monitoring exhaust gases from the engine 16 with the exhaust gas sensor 23 so that any undesirable exhaust emissions will be minimized.

When the engine 16 is thus ignited and started, since the exhaust gas sensor 23 has already been activated, the rotational speed N and the throttle opening of the engine 16 have been controlled for better fuel ignitability, and the exhaust gas purifying catalyst 24 has already been activated, any undesirable exhaust emissions can sufficiently be reduced.

The engine 16 is continuously cranked when the engine 16 is thus ignited and started.

In controlling the engine controller 18 and the generator controller 20 after being activated, the electric generation management device 21 determines, as described above with respect to the STEP 17, whether the combustion of fuel in the engine 16 has reached a fully combusted state or not based on a signal issued from the full-combustion determining unit 41.

Figure 11:
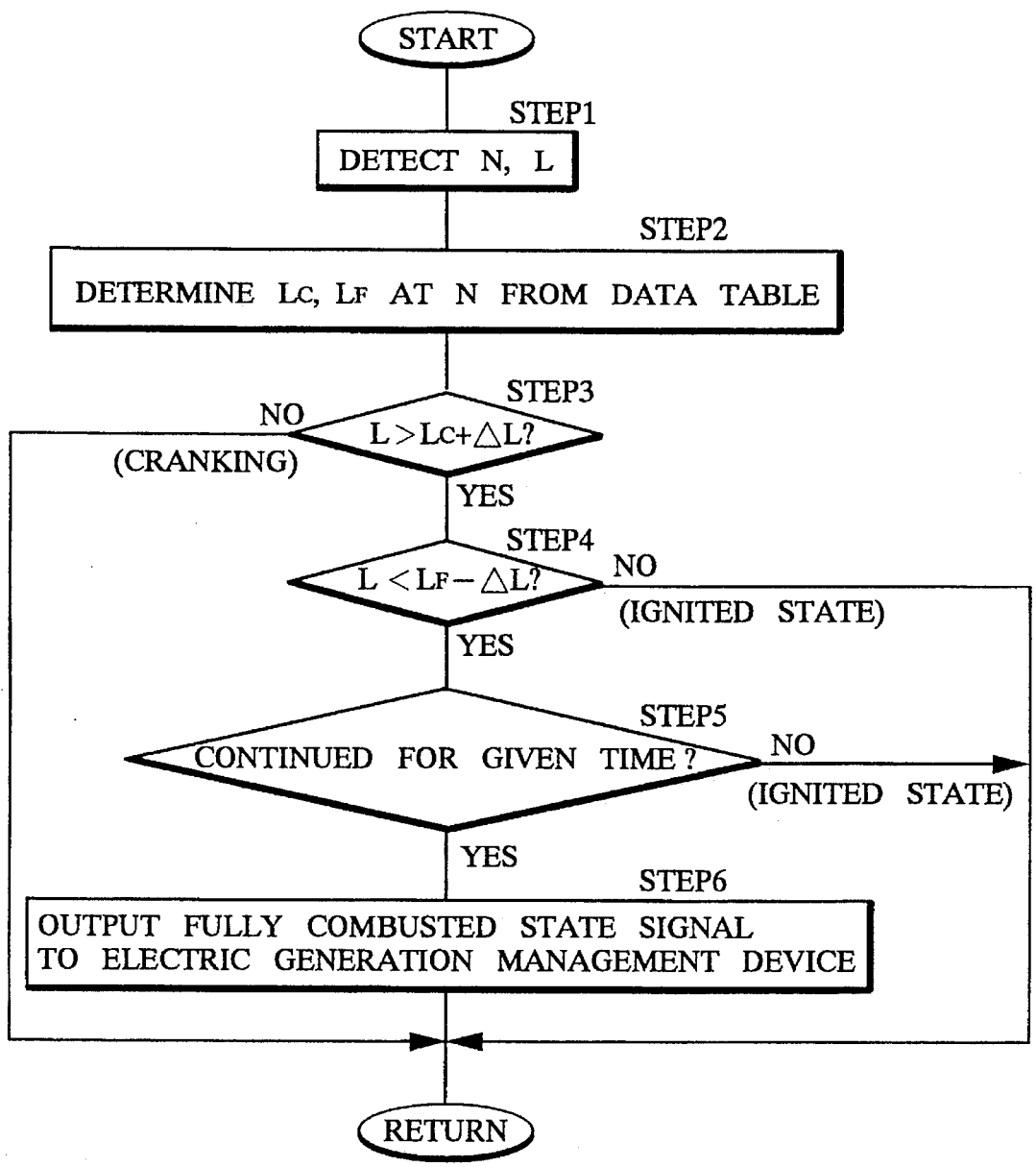
FIG. 11 is a flowchart of a full-combustion decision mode of operation of the electric energy generating apparatus of the hybrid vehicle shown in FIG. 1.

Specifically, whether the combustion of fuel in the engine 16 has reached a fully combusted state or not is determined by the full-combustion determining unit 41 in a full-combustion decision mode shown in FIG. 11.

Figure 12:
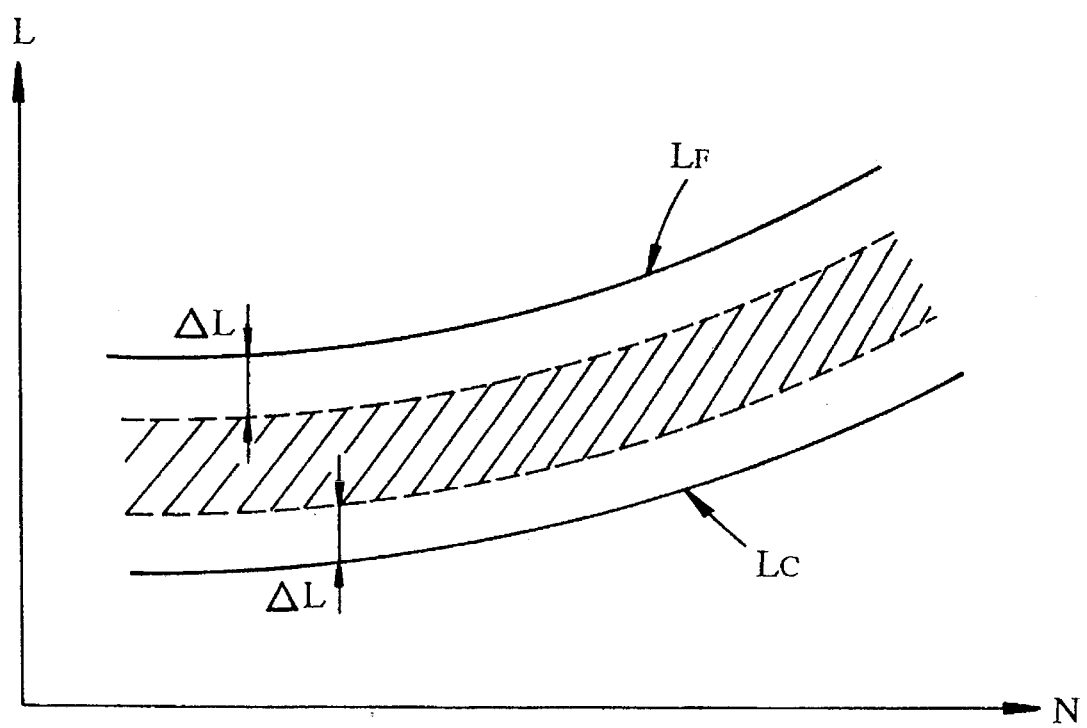
FIG. 12 is a diagram showing the manner in which the electric energy generating apparatus of the hybrid vehicle shown in FIG. 1 operates in the full-combustion decision mode.

As shown in FIG. 11, the full-combustion determining unit 41 detects a rotational speed N and an engine load L of the engine 16 respectively with the engine speed sensor 27 and the load detector 26 in a STEP 1, and then determines an engine load $L_C$ at the detected rotational speed N when the engine 16 is cranked and an engine load $L_F$ when fuel starts being combusted in the engine 16, i.e., when fuel is in an ignited state to start the engine 16, from a data table shown in FIG. 12, in a STEP 2. The data table shown in FIG. 12 contains various different engine loads $L_C$, $L_F$ experimentally determined at various rotational speeds N of the engine 16. At any of the rotational speeds N of the engine 16, the corresponding engine load $L_F$ when fuel is in the ignited state in the engine 16 is larger than the corresponding engine load $L_C$ when the engine 16 is cranked. When fuel in the engine 16 is in the fully combusted state in which the fuel combustion is stable in the engine 16, the load on the engine 16 is smaller than the engine load $L_F$ and larger than the engine load $L_C$ at any of the rotational speeds N.

After having detected the engine load $L_F$ and the engine load $L_C$, the full-combustion determining unit 41 determines whether the present detected engine load L is greater than the engine load $L_C$ upon cranking by a predetermined value $\Delta L$ (see FIG. 12) or not in a STEP 3. If $L \leq L_C + \Delta L$, i.e., if the present engine load L is close to the engine load $L_C$ upon cranking, then the full-combustion determining unit 41 determines that the engine 16 is being cranked.

If $L > L_C + \Delta L$, then full-combustion determining unit 41 determines whether the engine load L is smaller than the engine load $L_F$ upon start of fuel combustion (upon fuel ignition) by the predetermined value $\Delta L$ or not in a STEP 4. If $L \geq L_F - \Delta L$, i.e., if the present engine load L is close to the engine load $L_F$ upon start of fuel combustion, then the full-combustion determining unit 41 determines that the fuel combustion in the engine 16 is in an ignited state in which the fuel combustion is unstable.

If $L_F - \Delta L < L < L_C + \Delta L$, then the fuel combustion in the engine 16 is basically considered to be in a fully combusted state. However, when the fuel combustion in the engine 16 is in an ignited state, the engine load L may temporarily be in the condition: $L < L_F - \Delta L$ because the fuel combustion is unstable. Therefore, the full-combustion determining unit 41 determines whether the engine load condition: $L_F - \Delta L < L < L_C + \Delta L$ has continued for a predetermined period of time or not in a STEP 5. If the engine load condition: $L_F - \Delta L < L < L_C + \Delta L$ has continued for the predetermined period of time, then the full-combustion determining unit 41 issues a signal indicating that the engine load condition: $L_F - \Delta L < L < L_C + \Delta L$ has continued for the predetermined period of time to the electric generation management device 21 in a step 6. If the engine load condition: $L_F - \Delta L < L < L_C + \Delta L$, has not continued for the predetermined period of time, then the full-combustion determining unit 41 determines that the fuel combustion in the engine 16 is still in an ignited state.

The full-combustion decision mode thus carried out as described above with reference to FIG. 11 allows the electric generation management device 21 to determine reliably that the fuel combustion in the engine 16 is in a fully combusted state.

When the electric generation management device 21 has determined that the fuel combustion in the engine 16 is in a fully combusted state after the start of the fuel combustion, the electric generation management device 21 determines whether the generator 17 is switched from the motor mode to the generator mode based on a response signal from the generator controller 20 in a STEP 19 in FIG. 6. If not, the switching commanding unit 34 instructs the generator controller 20 to switch the generator 17 from the motor mode to the generator mode in a STEP 20.

The switching control unit 45 of the generator controller 20 now switches the generator 17 from the motor mode to the generator mode in a generator switching control mode shown in FIG. 13.

Specifically, as shown in FIG. 13, the switching control unit 45 detects a present rotational speed N of the generator 17 with the engine speed sensor 27 in a STEP 1. Then, the switching control unit 45 determines, according to a given formula, a command value $I_{OUT}M$ for a motor current necessary to bring the present rotational speed N of the generator 17 into agreement with the target starting rotational speed $N_{CR}$ given from the starting rotational speed setting unit 32a when the generator 17 operates as an electric motor, in a STEP 2. Similarly, the switching control unit 45 determines, according to a given formula, a command value $I_{OUT}G$ for a generator current necessary to bring the present rotational speed N of the generator 17 into agreement with the presently given target starting rotational speed $N_{CR}$ when the generator 17 operates as a generator, in a STEP 3.

The switching control unit 45 compares the detected rotational speed N and the target starting rotational speed $N_{CR}$ in a STEP 4. If $N \geq N_{CR}$, i.e., if the rotational speed N is slightly higher than the target starting rotational speed $N_{CR}$, then the switching control unit 45 outputs the command value $I_{OUT}M$ determined in the STEP 2 to the generator energy supply controller 19 in a STEP 5. The generator energy supply controller 19 now adjusts the duty cycle of switching pulses according to the command value $I_{OUT}M$ for thereby reducing the rotational speed of the generator 17 so as to be lower than the target starting rotational speed $N_{CR}$.

If $N < N_{CR}$ in the STEP 4 (YES), i.e., if the rotational speed N is slightly lower than the target starting rotational speed $N_{CR}$, then the switching control unit 45 reduces a command value $I_{OUT}M_X$, which is presently given to the generator energy supply controller 19 to operate the generator 17 as an electric motor, stepwise by a predetermined value $\Delta I_M$ until the command value $I_{OUT}M_X$ will finally becomes "0" ($I_{OUT}M_X \leftarrow I_{OUT}M_X - \Delta I_M$), and outputs the new command value $I_{OUT}M_X$ to the generator energy supply controller 19 in STEPs 6 ~8. The generator energy supply controller 19 gradually reduces the amount of electric energy which is being supplied from the battery 3 to the generator 17 to operate the generator 17 as an electric motor.

Thereafter, the switching control unit 45 increases a command value $I_{OUT}G_X$, which is given to operate the generator 17 as a generator, stepwise from an initial value $I_{OUT}G_{INT}$ by a predetermined value $\Delta I_G$ until the command value $I_{OUT}G_X$ will finally reach the command value $I_{OUT}G$ determined in the STEP 3 ($I_{OUT}G_X \leftarrow I_{OUT}G_X + \Delta I_G$), and outputs the new command value $I_{OUT}G_X$ to the generator energy supply controller 19 in STEPs 9~13. The generator energy supply controller 19 gradually increases the amount of electric energy generated by the generator 17, which has started to generate electric energy.

Figure 14A:
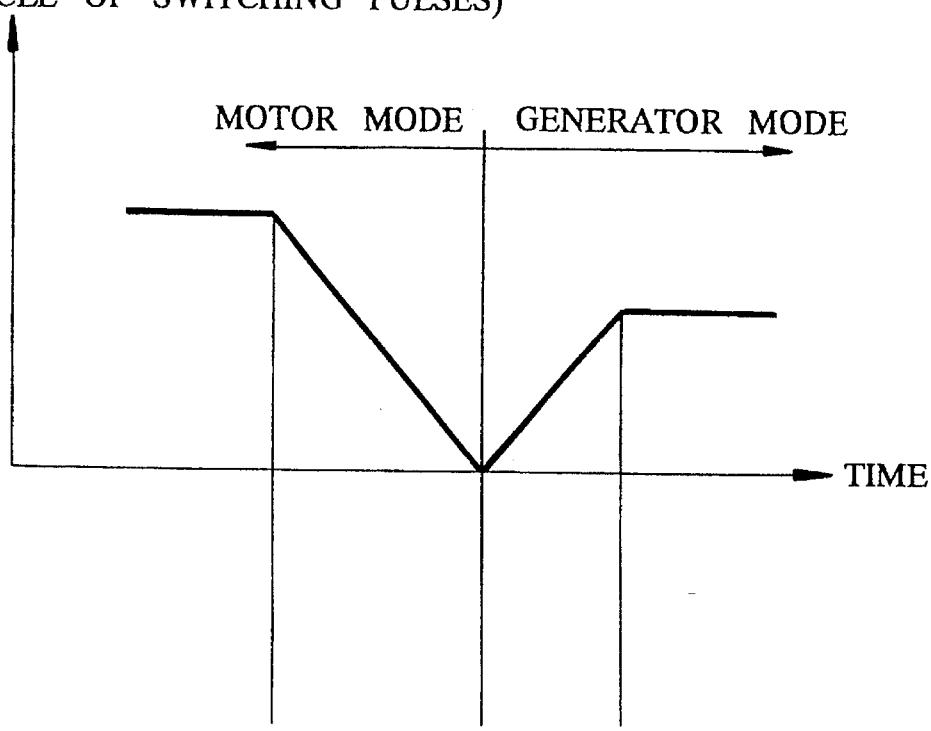
FIGS. 14(a) and 14(b) are diagrams showing the manner in which the electric energy generating apparatus of the hybrid vehicle shown in FIG. 1 operates in the generator switching control mode.
Figure 14B:
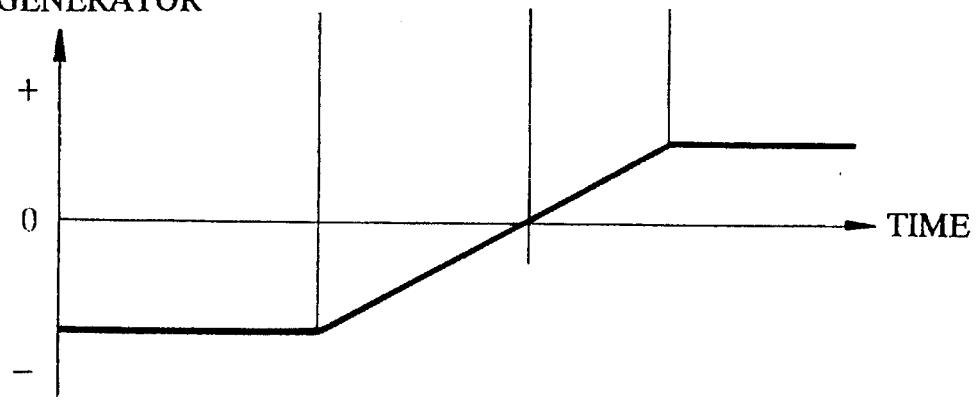

In the above generator switching control mode, the current command value applied to the generator energy supply controller 19 varies as shown in FIG. 14(*a*). At this time, the load imposed on the engine 16 by the generator 17 does not sharply vary, but gradually varies from a condition in which the engine 16 is actuated by the generator 17 operating as an electric motor to a condition in which the engine 16 actuates the generator 17 to cause the generator 17 to generate electric energy, as shown in FIG. 14(*b*). Therefore, because the load on the engine 16 is not subject to sharp changes upon switching from the former condition to the latter condition, the engine 16 operates stably and does not produce unwanted vibrations. Since the engine 16 operates stably, the fuel combustion in the engine 16 is prevented from becoming unstable, and the engine 16 is prevented from emitting undesirable toxic exhaust gases.

After the generator switching control mode, the electric generation management device 21 carries out a warm-up control mode for warming up the engine 16 and generating electric energy with the generator 17 in a STEP 21 in FIG. 6.

Figure 15:
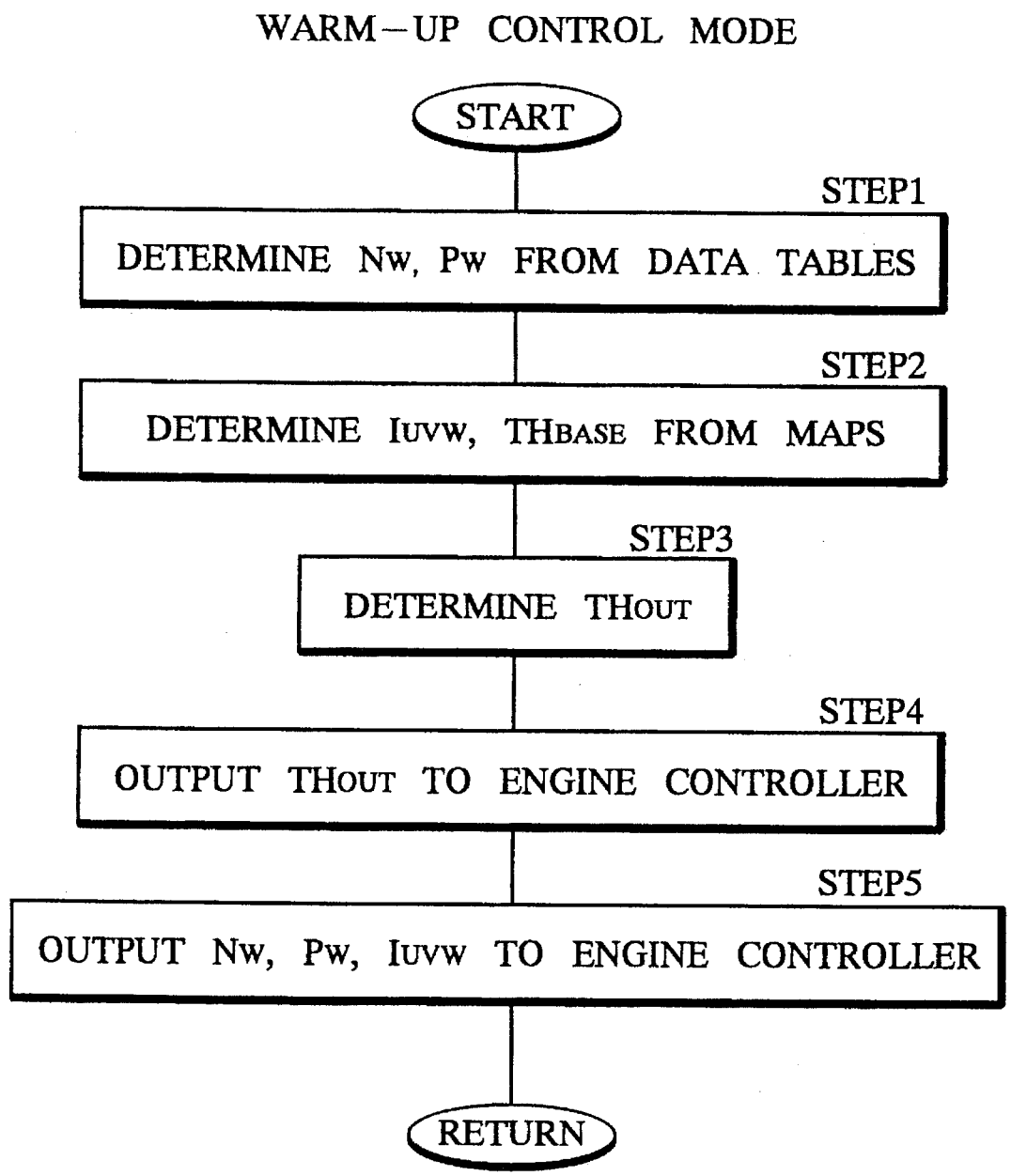
FIG. 15 is a flowchart of a warm-up control mode of operation of the electric energy generating apparatus of the hybrid vehicle shown in FIG. 1.

In the warm-up control mode, the warm-up control unit 35 of the electric generation management device 21 operates in an operation sequence shown in FIG. 15.

Figure 16:
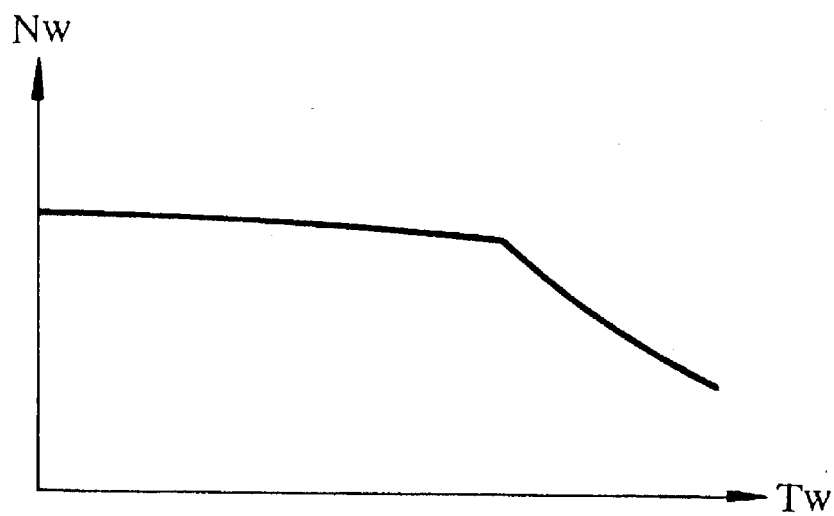
FIG. 16 is a diagram showing the manner in which the electric energy generating apparatus of the hybrid vehicle shown in FIG. 1 operates in the warm-up control mode.
Figure 17:
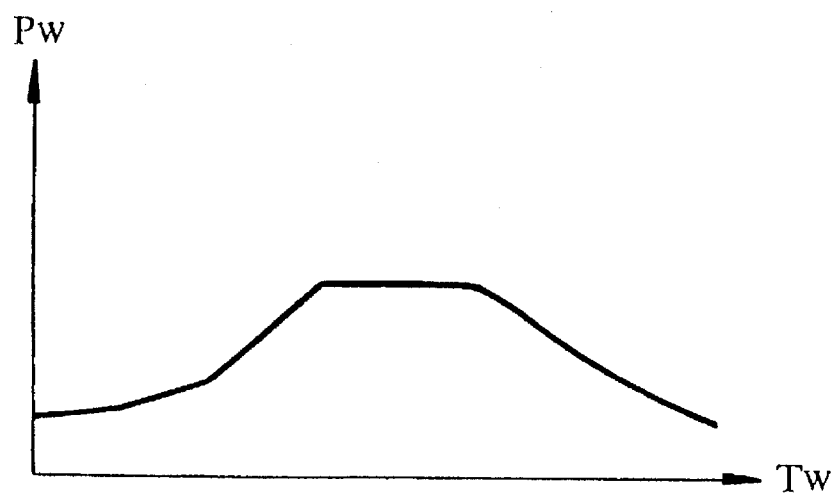
FIG. 17 is a diagram showing the manner in which the electric energy generating apparatus of the hybrid vehicle shown in FIG. 1 operates in the warm-up control mode.

As shown in FIG. 15, the warm-up control unit 35 first determines, in a STEP 1, a target warm-up rotational speed $N_W$ for the engine 16 and a target generated output $P_W$ for the generator 17 from respective data tables shown in FIGS. 16 and 17 based on the temperature $T_W$ of the engine 16 which is presently detected by the temperature sensor 25.

The data tables shown in FIGS. 16 and 17 are established in order to suppress unwanted exhaust emissions from the engine 16 and increase the generation efficiency of the generator 17 as much as possible.

Then, the warm-up control unit 35 determines, in a STEP 2, a target reference current $I_{UVW}$ for the generator 17 and a target reference throttle opening $TH_{BASE}$ for the engine 16 from predetermined maps based on the target warm-up rotational speed $N_W$ and the target generated output $P_W$ which have been determined in the STEP 1. The warm-up control unit 35 determines a command value $TH_{OUT}$ for the throttle opening of the engine 16 from the target reference throttle opening $TH_{BASE}$ according to a predetermined formula in a STEP 3.

The command value $TH_{OUT}$ for the throttle opening has been corrected depending on the difference between the present rotational speed N of the engine 16 (=the rotational speed of the generator 17) and the target warm-up rotational speed $N_W$ and the difference between the present generated output of the generator 17 and the target generated output $P_W$, and is determined in order to equalize those differences to "0".

The warm-up control unit 35 outputs the determined throttle opening command value $TH_{OUT}$ to the engine controller 18 in a STEP 4. The engine controller 18 now controls the throttle control unit 43 to control the throttle opening of the engine 16 through the throttle actuator 28 according to the given command value $TH_{OUT}$.

The warm-up control unit 35 then outputs target warm-up rotational speed $N_W$, the target generated output $P_W$, and the target reference current $I_{UVW}$ to the generator controller 20 in a STEP 5. The generator control unit 46 of the generator controller 20 corrects the target reference current $I_{UVW}$ depending on the difference between the present rotational speed N of the generator 17 and the target warm-up rotational speed $N_W$ and the difference between the present generated output of the generator 17 and the target generated output $P_W$ according to a predetermined formula, thereby to determine a command value $I_{OUT}$ for the generator current for equalizing the rotational speed of the generator 17 and the generated electric energy from the generator 17 to respective target values, and outputs the command value $I_{OUT}$ to the generator energy supply controller 19. The generator energy supply controller 19 adjusts the duty cycle of switching pulses according to the given command value $I_{OUT}$, thereby controlling the amount of electric energy generated by the generator 17.

In the warm-up control mode, the rotational speed N of the engine 16 and the generator 17 is controlled so as to be equal to the target warm-up rotational speed $N_W$, and the generated output of the generator 17 is controlled so as to be equal to the target generated output $P_W$. The engine 10 is thus warmed up with low unwanted exhaust emissions, and the generator 17 is actuated by the engine 16 to generate electric energy. The electric energy generated by the generator 17 is supplied to the battery 3 to charge the battery 3 and also to the propulsive electric motor 4 to propel the hybrid vehicle.

In the warm-up control mode, the combustion control unit 42 of the engine controller 18 supplies fuel to the engine 16 to warm up the engine 16 in a manner to reduce unwanted exhaust emissions while monitoring exhaust gases with the exhaust gas sensor 23.

When the propulsive electric motor 4 is subjected to regenerative braking in the warm-up control mode, the regeneration control unit 37 of the electric generation management device 21 carries out a regeneration control mode which corrects the throttle opening command value $TH_{OUT}$ that is determined from time to time by the warm-up control unit 35, in a STEP 25 shown in FIG. 6. Such a regeneration control mode will be described later on.

In the warm-up control mode, the outputting of the command value $I_{OUT}$ for the generator current from the generator controller 20 to the generator energy supply controller 19 is delayed from the outputting of the throttle opening command value $TH_{OUT}$ from the electric generation management device 21 to the engine controller 18. Such output delaying will also be described later on.

In FIG. 6, if the generator 17 switches its operation mode in the STEP 19 and the engine 10 starts being warmed up, then the electric generation management device 21 determines, from time to time, whether the warming-up of the engine 16 is finished or not, for example, based on the engine temperature $T_W$ detected by the temperature sensor 25, in a STEP 22.

If the warming-up of the engine 16 is finished, the electric generation management device 21 sets the E.M.Flg to "1" in a STEP 23, and carries out an electric generation control mode in a STEP 24.

Figure 18:
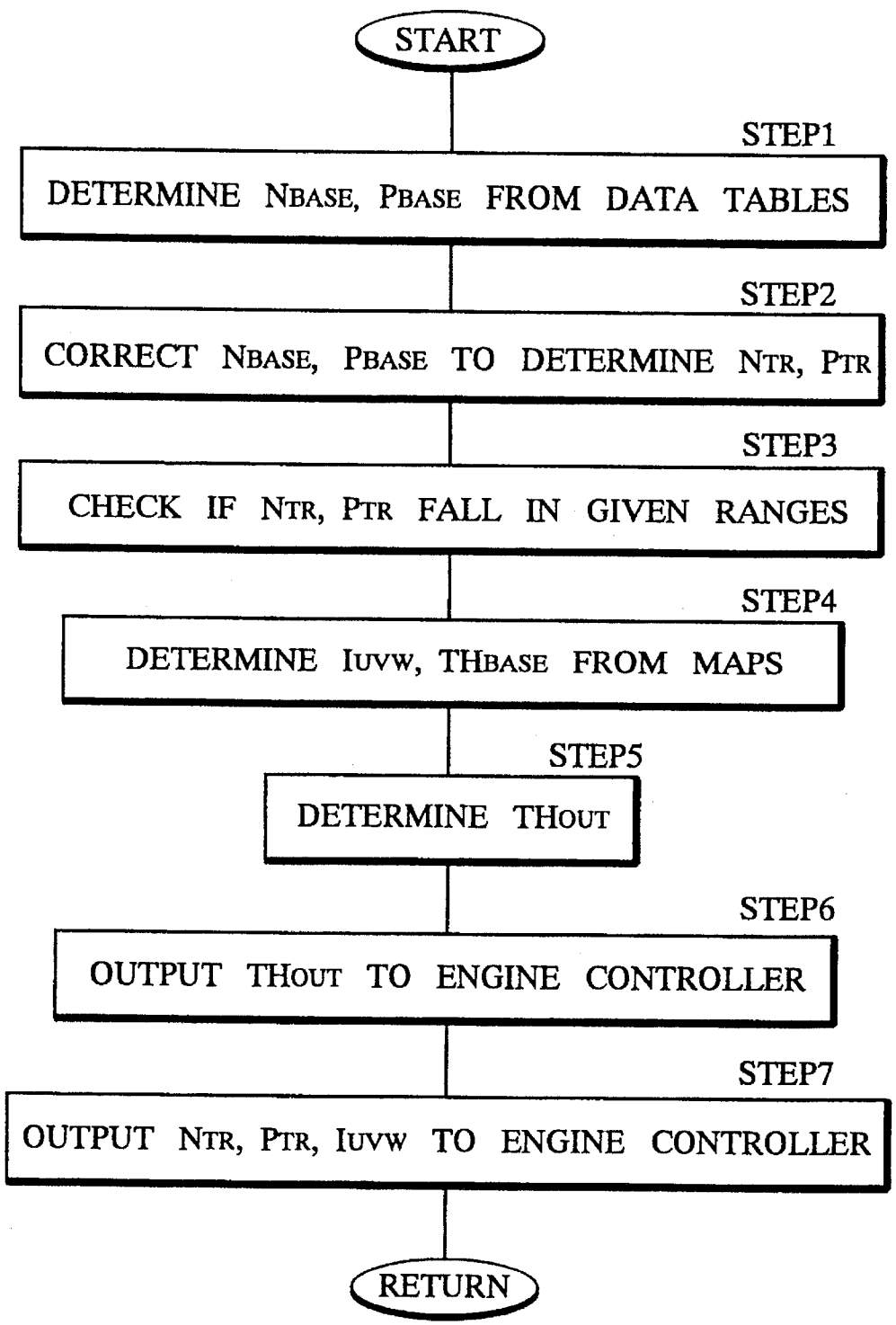
FIG. 18 is a flowchart of an electric generation control mode of operation of the electric energy generating apparatus of the hybrid vehicle shown in FIG. 1.

The electric generation control mode is carried out by the electric generation control unit 36 of the electric generation management device 21 as shown in FIG. 18.

Figure 19:
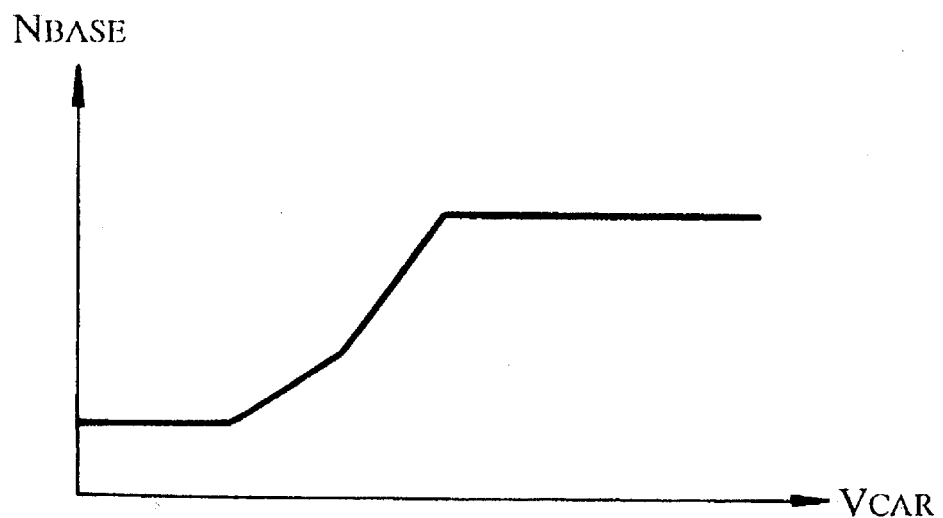
FIG. 19 is a diagram showing the manner in which the electric energy generating apparatus of the hybrid vehicle shown in FIG. 1 operates in the electric generation control mode.
Figure 20:
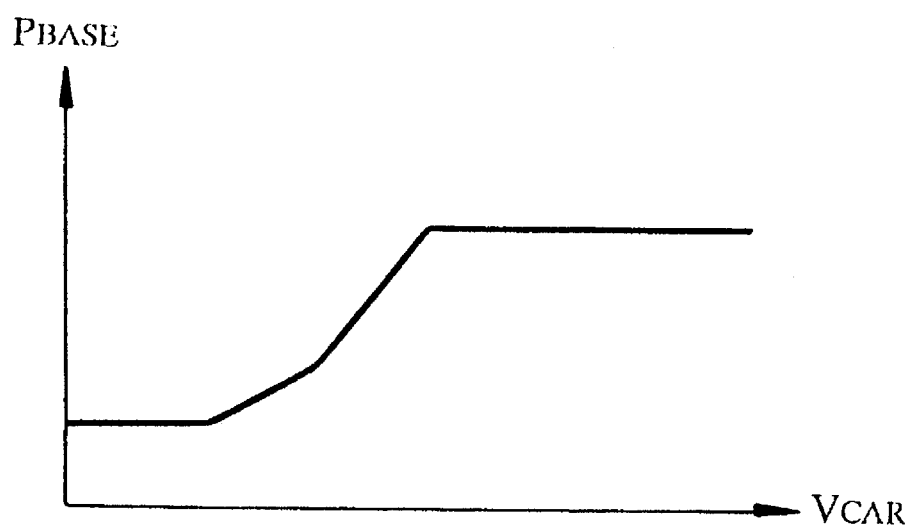
FIG. 20 is a diagram showing the manner in which the electric energy generating apparatus of the hybrid vehicle shown in FIG. 1 operates in the electric generation control mode.

In FIG. 18, the electric generation control unit 36 determines a target reference rotational speed $N_{BASE}$ for the engine 16 and the generator 17 and a target reference generated output $P_{BASE}$ for the generator 17 from respective predetermined data tables shown in FIGS. 19 and 20 based on the vehicle speed $V_{CAR}$ supplied from the vehicle propulsion management device 6, in a STEP 1. The data tables shown in FIGS. 19 and 20 are determined such that as the vehicle speed $V_{CAR}$ is higher, i.e., as the amount of electric energy required by the propulsive electric motor 4 is greater, the amount of electric energy generated by the generator 17 is greater.

The electric generation control unit 36 corrects the target reference rotational speed $N_{BASE}$ depending on the difference with the present rotational speed N, thereby determining a target rotational speed $N_{TR}$ for the engine 16 and the generator 17, and also corrects the target reference generated output $P_{BASE}$ depending on the difference with the present generated output, thereby determining a target generated output $P_{TR}$, in a STEP 2.

The electric generation control unit 36 checks if the target rotational speed $N_{TR}$ and the target generated output $P_{TR}$ fall respectively in an allowable speed range of the engine 16 and the generator 17 and an allowable generated output range of the generator 17 in a STEP 3. Thereafter, the electric generation control unit 36 determines a target reference current $I_{UVW}$ for the generator 17 and a target reference throttle opening $TH_{BASE}$ for the engine 16 from predetermined maps in the same manner as with the warm-up control mode, in a STEP 4.

Then, as with the warm-up control mode, the electric generation control unit 36 corrects the target reference throttle opening $TH_{BASE}$ according to a predetermined formula depending on the difference between the target rotational speed $N_{TR}$ and the present rotational speed N and the difference between the target generated output $P_{TR}$ and the present generated output, thus determining a command value $TH_{OUT}$ for the throttle opening which will equalize the rotational speed and the generated output to respective target values, in a STEP 5. The electric generation control unit 36 then outputs the command value $TH_{OUT}$ to the engine controller 18 in a STEP 6. The engine controller 18 now controls the throttle control unit 43 to control the throttle opening of the engine 16 through the throttle actuator 28 according to the given command value $TH_{OUT}$.

The electric generation control unit 36 outputs the target rotational speed $N_{TR}$, the target generated output $P_{TR}$, and the target reference current $I_{UVW}$ to the generator controller 20 in a STEP 7. The generator control unit 46 of the generator controller 20 corrects the target reference current $I_{UVW}$ depending on the difference between the target rotational speed $N_{TR}$ and the present rotational speed N and the difference between the target generated output $P_{TR}$ and the present generated output according to a predetermined formula, thereby to determine a command value $I_{OUT}$ for the generator current. The electric generation control unit 36 controls the generator energy supply controller 19 to control the amount of electric energy generated by the generator 17 according to the given command value $I_{OUT}$.

In the electric energy generation mode, the rotational speed N of the engine 16 and the generator 17 is controlled so as to be equal to the target rotational speed $N_{TR}$, and the generated output of the generator 17 is controlled so as to be equal to the target generated output $P_{TR}$. The generation of electric energy is thus effected adequately by the generator 17 depending on conditions in which the hybrid vehicle runs. The electric energy generated by the generator 17 is supplied to the battery 3 to charge the battery 3 and also to the propulsive electric motor 4 to propel the hybrid vehicle. Since the amount of electric energy generated by the generator 17 is greater as the amount of electric energy required by the propulsive electric motor 4 is greater, the amount of electric energy supplied from the battery 3 to the propulsive electric motor 4 may be smaller when the amount of electric energy required by the propulsive electric motor 4 is greater, and any reduction in the capacity of the battery 3 is minimized.

In the electric energy generation mode, the combustion control unit 42 of the engine controller 18 supplies fuel to the engine 16 to warm up the engine 16 in a manner to reduce unwanted exhaust emissions while monitoring exhaust gases with the exhaust gas sensor 23.

When the propulsive electric motor 4 is subjected to, or is being subjected to, regenerative braking in the electric energy generation mode or the warm-up control mode, the regeneration control unit 37 of the electric generation management device 21 carries out a regeneration control mode which corrects the throttle opening command value $TH_{OUT}$ that is determined by the electric generation control unit 36 or the warm-up control unit 35 of the electric generation management device 21.

Figure 21:
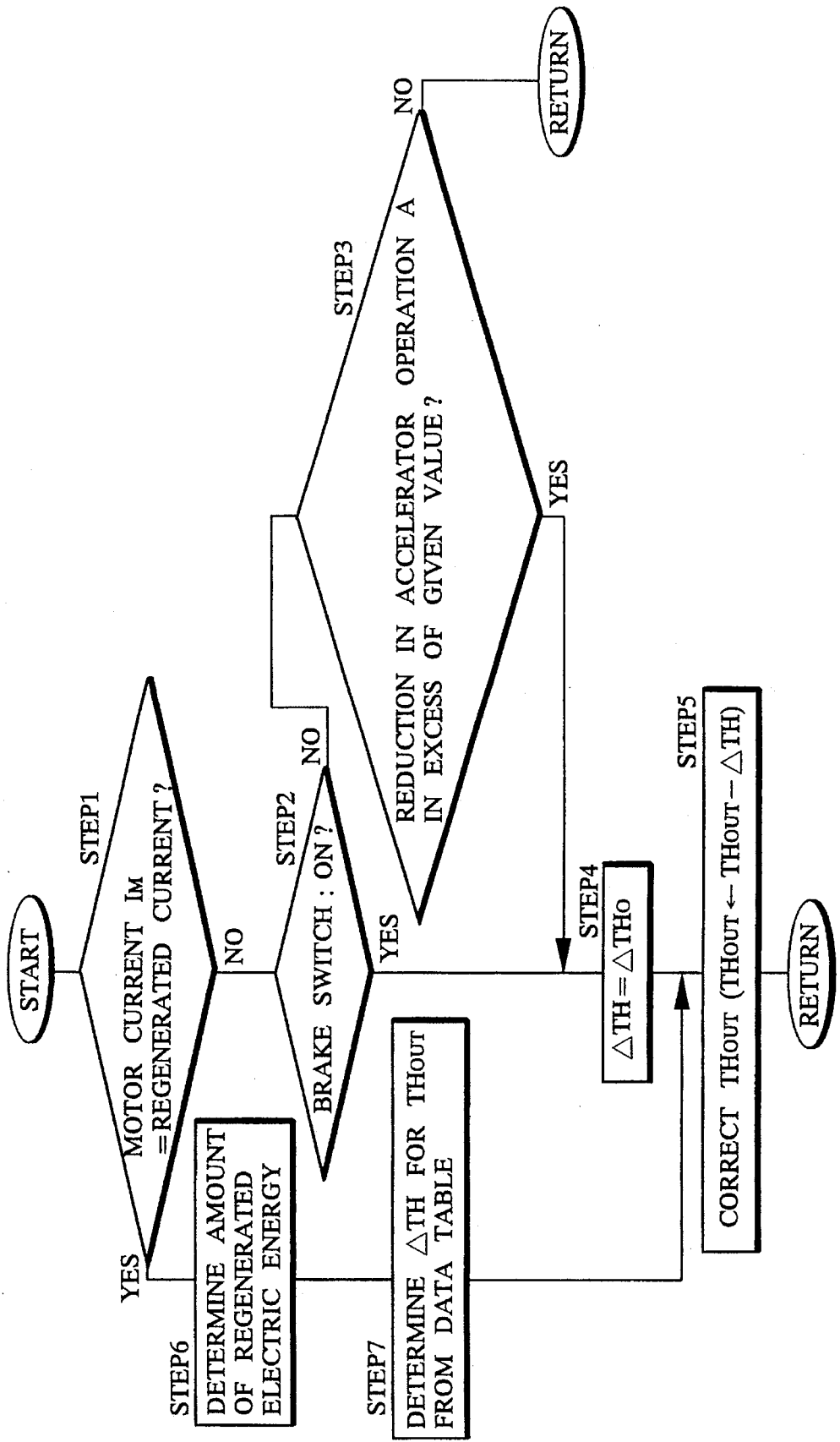
FIG. 21 is a flowchart of a regeneration control mode of operation of the electric energy generating apparatus of the hybrid vehicle shown in FIG. 1.

The regeneration control mode is carried out as shown in FIG. 21. In FIG. 21, while electric energy is being generated by the generator 17, the regeneration control unit 37, specifically, the regenerative braking detector 37a thereof, determines from time to time whether the motor current $I_M$ supplied from the current sensor 10b through the vehicle propulsion management device 6 is a current flowing from the battery 3 to the propulsive electric motor 4 or a regenerated current flowing from the propulsive electric motor 4 to the battery 3, based on the direction of the motor current $I_M$ in a STEP 1.

If the motor current $I_M$ is not a regenerated current, i.e., if the propulsive electric motor 4 has not yet been subjected to regenerative braking, then the regenerative braking detector 37a determines whether the hybrid vehicle has been braked or not based on a braking signal from the brake switch 8 in a STEP 2 and also determines whether a reduction with time in the accelerator operation A from the accelerator operation sensor 7 has exceeded a predetermined value or not in a STEP 3.

If the hybrid vehicle has been braked or the accelerator operation A has been reduced relatively greatly, then since regenerative braking is about to be effected on the regenerative electric motor 4, the corrective value setting unit 37b of the regeneration control unit 37 determines a corrective value ΔTH for the throttle opening command value $TH_{OUT}$ as a predetermined value $ΔTH_o$ in a STEP 4. The regeneration control unit 37 then subtracts the determined corrective value ΔTH from the throttle opening command value $TH_{OUT}$ which is determined by the electric generation control unit 36 or the warm-up control unit 35 as described above, thereby correcting the throttle opening command value $TH_{OUT}$ in a STEP 5. The electric generation control unit 36 or the warm-up control unit 35 outputs the corrected command value $TH_{OUT}$ to the engine controller 81. The throttle opening of the engine 16 is now controlled into a throttle opening which is the corrective value $\Delta TH$ smaller than the throttle opening at the time the generator 17 normally generates electric energy.

Figure 22:
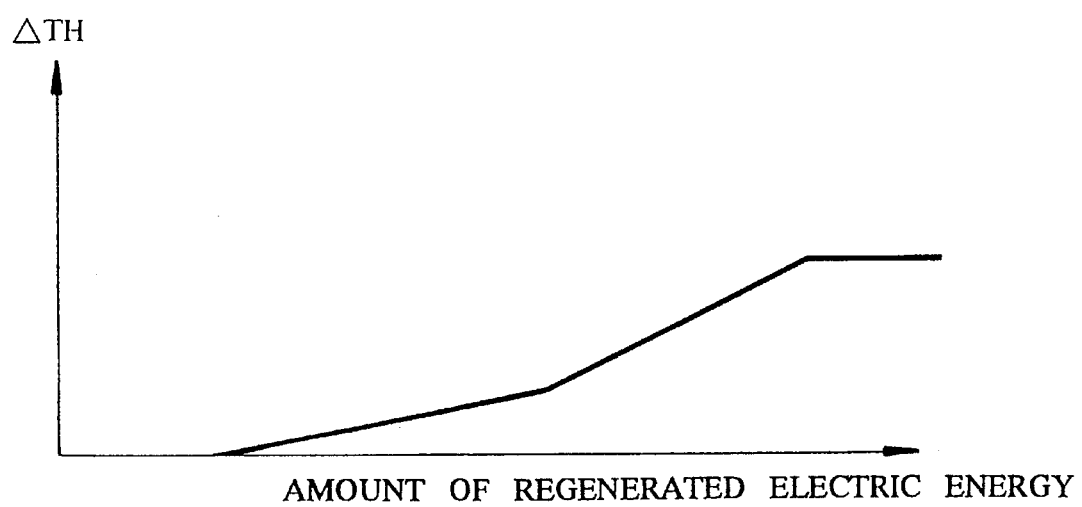
FIG. 22 is a diagram showing the manner in which the electric energy generating apparatus of the hybrid vehicle shown in FIG. 1 operates in the regeneration control mode.

If the motor current $I_M$ is a regenerated current in the STEP 1 (YES), i.e., if the propulsive electric motor 4 has already been subjected to regenerative braking, then the regenerated energy calculating unit 37d of the regeneration control unit 37 determines an amount of regenerated electric energy according to a predetermined formula from the regenerated current $I_M$ and a voltage $V_B$ detected by the voltage sensor 11 in a STEP 6. Based on the magnitude of the determined amount of regenerated electric energy, the corrective value setting unit 37c determines a corrective value $\Delta TH$ for the throttle opening command value $TH_{OUT}$ from a predetermined data table shown in FIG. 22 in a STEP 7. Basically, the corrective value $\Delta TH$ is greater as the amount of regenerated electric energy is greater.

Thereafter, the regeneration control unit 37 subtracts the determined corrective value $\Delta TH$ from the throttle opening command value $TH_{OUT}$ which is determined by the electric generation control unit 36 or the warm-up control unit 35 as described above, thereby correcting the throttle opening command value $TH_{OUT}$ in the STEP 5.

The throttle opening command value $TH_{OUT}$ is corrected for the following reasons: When the propulsive electric motor 4 is operating as an electric motor, the electric load on the generator 17 is imposed by both the battery 3 and the propulsive electric motor 4. When the propulsive electric motor 4 is subjected to regenerative braking, no electric energy is supplied to the propulsive electric motor 4, and the electric load on the generator 17 is imposed by only the battery 3, and hence is greatly reduced. The electric load on the generator 17 is smaller as the amount of regenerated electric energy of the propulsive electric motor 4 is greater. When the electric load on the generator 17 is greatly reduced, the load on the engine 16 which actuates the generator 17 is also greatly reduced. Consequently, the engine 16 tends to race easily. When the engine 16 races, the engine 16 discharges undesirable exhaust emissions and unduly vibrates. This condition can be avoided by correcting the throttle opening in a manner to decrease when regenerative braking is about to be effected or correcting the throttle opening in a manner to decrease by the corrective value $\Delta TH$ depending on the amount of regenerated electric energy while regenerative braking is being effected. Therefore, the engine 16 can be prevented from racing and operate stably, and will not discharge unwanted exhaust emissions and suffer undue vibrations.

In the electric energy generation mode or the warm-up control mode, the generator current command value $I_{OUT}$ which is determined from time to time by the generator controller 20 under the command of the electric generation control unit 36 or the warm-up control unit 35 is outputted to the generator energy supply controller 19 at a time slightly after the time at which the throttle opening command value $TH_{OUT}$ (which may be corrected by the regeneration control unit 37) determined from time to time by the electric generation control unit 36 or the warm-up control unit 35 concurrent with the calculation of the generator current command value $I_{OUT}$ is outputted to the engine controller 18.

More specifically, as shown in FIG. 23, in the electric generation control mode, for example, the electric generation control unit 36 and the generator control unit 46 simultaneously determine a command value $TH_{OUT}$ for the throttle opening and a command value $I_{OUT}G$ for the generator current, respectively, in a STEP 1, and thereafter the electric generation management device 21 determines a difference $\Delta N_{TR}$ between the target rotational speed $N_{TR}$ for the generator 17 which has been given to the generator controller 20 in a preceding cycle time and the target rotational speed $N_{TR}$ for the generator 17 which has been given to the generator controller 20 in a present cycle time in a STEP 2.

The electric generation management device 21 determines whether the rotational speed of the engine 16 is increased or reduced depending on whether the difference is positive or negative in a STEP 3. If $\Delta N_{TR} > 0$, then the electric generation management device 21 determines a delay time $T_{DLY}$ for the time to output the generator current command value $I_{OUT}G$ from a predetermined speed increasing map based on the present rotational speed N detected by the engine speed sensor 27 and the difference $\Delta N_{TR}$ in a STEP 4a. If $\Delta N_{TR} < 0$, then the electric generation management device 21 determines a delay time $T_{DLY}$ for the time to output the generator current command value $I_{OUT}G$ from a predetermined speed reducing map based on the present rotational speed N and the difference $\Delta N_{TR}$ in a STEP 4b. Basically, the delay time $T_{DLY}$ increases as the difference $\Delta N_{TR}$ is greater.

Then, the electric generation management device 21 outputs the throttle opening command value $TH_{OUT}$ from the electric generation control unit 36 to the engine controller 18, varying the throttle opening of the engine 16 in a STEP 5. The electric generation management device 21 determines whether the delay time $T_{DLY}$ has elapsed or not in a STEP 6. If the delay time $T_{DLY}$ has elapsed, then the electric generation management device 21 controls the generator controller 20 to output the generator current command value $I_{OUT}G$ to the generator energy supply controller 19, varying the duty cycle of switching pulses which control the amount of electric energy generated by the generator 17 in a STEP 7.

The above operation sequence shown in FIG. 23 is carried out also in the warm-up control mode.

The time to output the generator current command value $I_{OUT}G$ is delayed for the reasons described below.

Generally, while the generator 17 can be controlled with a good response, the engine 16 tends to suffer a delay in varying the amount of intake air when a command is given to vary the throttle opening. Therefore, when the current of the generator 17 and the throttle opening of the engine 16 are simultaneously controlled, even though the current of the generator 17 can be controlled immediately, the engine 16 suffers a delay until it produces drive forces demanded by the varied throttle opening. Therefore, the engine 16 undergoes load variations before the drive forces generated by the engine 16 vary, and tends to operate unstably. When the engine 16 operates unstably, the engine 16 discharges undesirable exhaust emissions and unduly vibrates. The time of the delay generally differs depending on the rotational speed of the engine 16, a variation in the rotational speed thereof, or the direction in which the rotational speed thereof varies, i.e., whether the rotational speed thereof increases or decreases.

To avoid the above problems, the time to output the generator current command value $I_{OUT}G$ is delayed for the delay time $T_{DLY}$ depending on the target rotational speed $N_{TR}$ for the engine 16, the difference $\Delta N_{TR}$, and whether the difference $\Delta N_{TR}$ is positive or negative, i.e., whether the rotational speed is increased or reduced. When the time to output the generator current command value $I_{OUT}G$ is delayed for the delay time $T_{DLY}$, the current control for the generator 17 and the drive force control for the engine 16 are synchronized with each other thereby to operate the engine 16 stably. As a consequence, the engine 16 is prevented from discharging undesirable exhaust emissions and unduly vibrating.

On the hybrid vehicle in the above embodiment, the above operation sequence is repeated in each of the cycle times. Specifically, if the remaining capacity C of the battery 3 is reduced ($C<C_L$) or the battery 3 is unable to output the amount of electric energy required to propel the hybrid vehicle ($P_{MAX} \leq P_{motor}$) while the vehicle propelling apparatus 1 is in operation such as when the hybrid vehicle is running, then except when the canister is being purged, the engine 16 is started by the generator 17 acting as a starter motor. After the engine 16 has been warmed up, the generator 17 generates electric energy depending on conditions in which the hybrid vehicle runs, and the generated electric energy is supplied to the battery 3 and the propulsive electric motor 4.

When the hybrid vehicle is running on a highland, for example, since air supplied to the engine 16 for burning fuel therein is thinner than in plain geographical regions, drive forces produced by the engine 16 are smaller than in plain geographical regions, and hence the amount of electric energy generated by the generator 17 is reduced, allowing the battery 3 to be discharged quickly. However, inasmuch as the threshold value $C_L$ for determining the time to activate the electric energy generating apparatus 2 is greater as the atmospheric pressure is lower, the battery 3 and the propulsive electric motor 4 start being supplied with electric energy from the generator 17 at an early stage where the capacity of the battery 3 is relatively large. Therefore, since it takes time until the capacity of the battery 3 is lowered to a level where the battery 3 needs to be charged, the hybrid vehicle can travel in a sufficiently long range on the highland in the same manner as when it runs in plain geographical regions.

When the battery 3 is unable to output the amount of electric energy required to propel the hybrid vehicle ($P_{MAX} \leq P_{motor}$), the electric energy generating apparatus 2 begins to generate electric energy. Consequently, the running performance of the hybrid vehicle is sufficiently maintained.

As described above, the electric energy generating apparatus 2 is activated at an appropriate time determined in view of the condition of the battery 3 and the running performance of the hybrid vehicle, for supplying electric energy to the battery 3 and the propulsive electric motor 4. When the engine 16 is started, it tends to produce unwanted exhaust emissions and undue vibrations. However, because the engine 16 is started under adequate conditions as described above, the engine 16 has exhaust gas properties and vibration characteristics optimized for environmental protection.

While the electric energy generating apparatus 2 is activated depending on the remaining capacity C of the battery 3 and the effective maximum output $P_{MAX}$ in the above embodiment, the electric energy generating apparatus 2 may be activated only when the rate of change with time of the remaining capacity C sharply decreases beyond a given value due to a sharp increase in the accelerator operation A. Specifically, when the remaining capacity C of the battery 3 is of a relatively low level, if the accelerator operation A is sharply increased, then the remaining capacity C of the battery 3 is sharply reduced, and no sufficient electric energy is supplied from the battery 3 to the propulsive electric motor 4, with the result that the hybrid vehicle may not be able to meet certain required demands for running performance, e.g., may not be able to accelerate quickly. In such a case, the electric energy generating apparatus 2 may be activated to avoid the above shortcoming.

While the starting rotational speed $N_{CR}$ of the engine 16 is established depending on the engine temperature $T_W$ in the above embodiment, the starting rotational speed $N_{CR}$ may be established depending on the intake temperature of the engine 16.

Although a certain preferred embodiment of the present invention has been shown and described in detail, it should be understood that various changes and modifications may be made therein without departing from the scope of the appended claims.

What is claimed is:

1. An electric generation control system for use on a hybrid vehicle having a vehicle propelling apparatus including a battery and a propulsive electric motor energizable by the battery, and an electric energy generating apparatus including an engine and a generator actuatable by the engine, the generator being operable in a generator mode in which when the vehicle propelling apparatus is in operation, the generator is actuated by the engine to generate electric energy to be supplied to the battery and/or the propulsive electric motor, and when the hybrid vehicle is decelerated, the propulsive electric motor is subjected to regenerative braking and regenerated electric energy produced thereby is supplied to the battery, said electric generation control system comprising:

target generated output setting means for determining a target generated output for the generator based on an operating condition of the hybrid vehicle;

intake air control valve control means for controlling the opening of an intake air control valve of the engine to enable the engine to produce a power output corresponding to said target generated output;

regenerative braking detecting means for detecting regenerative braking of the propulsive electric motor; and correcting means for correcting the opening of the intake air control valve of the engine depending on the target generated output in a direction to decrease when regenerative braking of the propulsive electric motor is detected by said regenerative braking detecting means.

2. An electric generation control system according to claim 1, wherein said target generated output setting means comprises means for establishing the target generated output for the generator depending on at least a vehicle speed of the hybrid vehicle.

3. An electric generation control system according to claim 1, further comprising means for warming up the engine while causing said generator to generate electric energy depending on a temperature of the engine immediately after the engine and the generator have been started, said target generated output setting means comprising means for establishing the target generated output depending on the temperature of the engine when the engine is warmed up.

4. An electric generation control system according to claim 3, wherein said target generated output setting means comprises means for establishing the target generated output for the generator depending on at least a vehicle speed of the hybrid vehicle after the engine has been warmed up.

5. An electric generation control system according to claim 1, wherein said intake air control valve control means for determining a target rotational speed for the engine to produce a power output from the engine corresponding to said target generated output, and controlling the opening of the intake air control valve to equalize the rotational speed of the engine to said target rotational speed.

6. An electric generation control system according to claim 1, further comprising accelerator operation detecting means for detecting an operation of an accelerator of the hybrid vehicle, said regenerative braking detecting means comprising means for detecting regenerative braking of the propulsive electric motor when the operation of the accelerator detected by said accelerator operation detecting means is reduced.

7. An electric generation control system according to claim 6, wherein said correcting means comprises means for correcting the opening of the intake air control valve of the engine depending on the target generated output in a direction to decrease by a predetermined amount when regenerative braking of the propulsive electric motor is detected by said regenerative braking detecting means based on the operation of the accelerator detected by said accelerator operation detecting means.

8. An electric generation control system according to claim 1, further comprising braking detecting means for detecting whether the hybrid vehicle is braked or not, said regenerative braking detecting means comprising means for detecting regenerative braking of the propulsive electric motor when the hybrid vehicle is braked as detected by said braking detecting means.

9. An electric generation control system according to claim 8, wherein said correcting means comprises means for correcting the opening of the intake air control valve of the engine depending on the target generated output in a direction to decrease by a predetermined amount when regenerative braking of the propulsive electric motor is detected by said regenerative braking detecting means based on braking of the hybrid vehicle detected by said braking detecting means.

10. An electric generation control system according to claim 1, further comprising regenerated current detecting means for detecting a regenerated current flowing from the propulsive electric motor to the battery, said regenerative braking detecting means comprising means for detecting regenerative braking of the propulsive electric motor when a regenerated current is detected by said regenerated current detecting means.

11. An electric generation control system according to claim 10, further comprising regenerated energy calculating means for determining an amount of regenerated electric energy based on the regenerated current detected by said regenerated current detecting means, and corrective value setting means for establishing a corrective value for the opening of the intake air control valve depending on the amount of regenerated electric energy determined by said regenerated energy calculating means, said correcting means comprising means for correcting the opening of the intake air control valve by a corrective value established by said corrective value setting means.

12. An electric generation control system according to claim 11, wherein said corrective value setting means comprising means for establishing a greater corrective value for the opening of the intake air control valve as the amount of regenerated electric energy determined by said regenerated energy calculating means is greater.

* * * * *